(12) United States Patent
Dawoud

(10) Patent No.: US 10,498,706 B2
(45) Date of Patent: *Dec. 3, 2019

(54) SEARCHABLE ENCRYPTION ENABLING ENCRYPTED SEARCH BASED ON DOCUMENT TYPE

(71) Applicant: Skyhigh Networks, Inc., Campbell, CA (US)

(72) Inventor: Hani T. Dawoud, San Jose, CA (US)

(73) Assignee: Skyhigh Networks, LLC, Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,929

(22) Filed: Aug. 27, 2018

(65) Prior Publication Data

US 2019/0124052 A1 Apr. 25, 2019

Related U.S. Application Data

(63) Continuation of application No. 15/849,347, filed on Dec. 20, 2017, now Pat. No. 10,063,528, which is a (Continued)

(51) Int. Cl.
*H04L 29/06* (2006.01)
*G06F 16/93* (2019.01)
(Continued)

(52) U.S. Cl.
CPC .......... *H04L 63/0471* (2013.01); *G06F 16/93* (2019.01); *G06F 21/602* (2013.01);
(Continued)

(58) Field of Classification Search
CPC .......... G06F 17/30864; G06F 21/6209; G06F 21/6218; H04L 9/14; H04L 63/0471;
(Continued)

(56) References Cited

U.S. PATENT DOCUMENTS

| 8,930,691 B2 * | 1/2015 | Kamara | G06F 21/6218 713/165 |
| 9,047,480 B2 | 6/2015 | Kahol et al. | |

(Continued)

OTHER PUBLICATIONS

Aswani et al. "Fuzzy Keyword Search over Encrypted Data Using Symbol-Based Trie-Traverse Search Scheme in Cloud Computing" Research Paper, Sep. 21, 2012, pp. 1-8.
(Continued)

*Primary Examiner* — Gary S Gracia
(74) *Attorney, Agent, or Firm* — Byrne Poh LLP

(57) ABSTRACT

A searchable encryption method enables encrypted search of encrypted documents based on document type. In some embodiments, the searchable encryption method is implemented in a network intermediary, such as a proxy server. The network intermediary encrypts documents on behalf of a user or an enterprise destined to be stored on a cloud service provider. The searchable encryption method encodes document type information into the encrypted search index while preserving encryption security. Furthermore, the searchable encryption method enables search of encrypted documents using the same encrypted index, either for a particular document type or for all encrypted documents regardless of the document type.

15 Claims, 15 Drawing Sheets

Related U.S. Application Data continuation of application No. 14/808,900, filed on Jul. 24, 2015, now Pat. No. 9,894,042.

(51) Int. Cl.
| | | |
|---|---|---|
| *H04L 29/08* | (2006.01) | |
| *G06F 21/60* | (2013.01) | |
| *G06F 21/62* | (2013.01) | |
| *H04L 9/06* | (2006.01) | |
| *H04L 9/32* | (2006.01) | |

(52) U.S. Cl.
CPC ........ *G06F 21/6227* (2013.01); *H04L 9/0637* (2013.01); *H04L 63/067* (2013.01); *H04L 67/1097* (2013.01); *G06F 2221/2107* (2013.01)

(58) Field of Classification Search
CPC ........... H04L 2209/76; H04L 2463/062; H04L 63/0478; H04L 63/068; H04L 9/08; H04L 9/0861; H04L 9/088; H04L 9/0897
USPC ........ 713/150, 154, 165, 168, 189; 707/759; 380/30
See application file for complete search history.

(56) References Cited

U.S. PATENT DOCUMENTS

| | | | | |
|---|---|---|---|---|
| 9,454,673 | B1* | 9/2016 | Sarukkai | G06F 21/6209 |
| 9,679,160 | B1* | 6/2017 | Zhang | H04L 9/14 |
| 2005/0177554 | A1* | 8/2005 | Peltonen | G06F 16/328 |
| 2010/0211781 | A1* | 8/2010 | Auradkar | G06F 21/6209 |
| | | | | 713/168 |
| 2011/0004599 | A1* | 1/2011 | Deninger | G06F 16/325 |
| | | | | 707/747 |
| 2011/0004607 | A1* | 1/2011 | Lokam | G06F 21/6227 |
| | | | | 707/759 |
| 2011/0119481 | A1* | 5/2011 | Auradkar | G06F 21/602 |
| | | | | 713/150 |
| 2012/0324240 | A1* | 12/2012 | Hattori | G06F 21/6227 |
| | | | | 713/189 |
| 2013/0091357 | A1* | 4/2013 | Moon | G06F 21/6227 |
| | | | | 713/168 |
| 2013/0148803 | A1* | 6/2013 | Jho | H04L 9/0861 |
| | | | | 380/44 |
| 2013/0159695 | A1* | 6/2013 | Chiueh | G06F 21/6227 |
| | | | | 713/150 |
| 2013/0262852 | A1* | 10/2013 | Roeder | H04L 9/0894 |
| | | | | 713/150 |
| 2013/0262863 | A1* | 10/2013 | Yoshino | H04L 9/008 |
| | | | | 713/165 |
| 2013/0346424 | A1 | 12/2013 | Zhang et al. | |
| 2014/0053227 | A1* | 2/2014 | Ruppin | G06F 21/10 |
| | | | | 726/1 |
| 2014/0095889 | A1* | 4/2014 | Araki | H04L 9/00 |
| | | | | 713/189 |
| 2014/0149435 | A1* | 5/2014 | Sisman | G06F 11/362 |
| | | | | 707/751 |
| 2014/0214838 | A1* | 7/2014 | Hendrey | G06F 16/285 |
| | | | | 707/737 |
| 2014/0355756 | A1* | 12/2014 | Iwamura | H04L 9/008 |
| | | | | 380/30 |
| 2014/0359282 | A1* | 12/2014 | Shikfa | G06F 21/602 |
| | | | | 713/165 |
| 2015/0039886 | A1* | 2/2015 | Kahol | G06F 21/10 |
| | | | | 713/165 |
| 2015/0039887 | A1* | 2/2015 | Kahol | G06F 21/6227 |
| | | | | 713/165 |
| 2015/0149427 | A1* | 5/2015 | Kerschbaum | G06F 16/951 |
| | | | | 707/706 |
| 2015/0154418 | A1* | 6/2015 | Redberg | G06F 21/602 |
| | | | | 713/165 |
| 2015/0229611 | A1* | 8/2015 | Kaushik | H04L 63/0281 |
| | | | | 713/162 |
| 2015/0356314 | A1 | 12/2015 | Kumar et al. | |

OTHER PUBLICATIONS

Cash et al., "Dynamic Searchable Encryption in Very-Large Databases: Data Structures and Implementation", Network and Distributed System Security Symposium, NDDSS, vol. 14, Feb. 2014, pp. 1-32.

Cash et al., "Highly-Scalable Searchable Symmertric Encryption with Support for Boolean Queries", 33rd International Cryptology Conference, Aug. 2013, pp. 1-21.

Kamara, S., "Encrypted Search" Research Paper, Spring 2015, p. 1-7, available online at: http://research.microsoft.com/en-us/um/people/snyk/pubs/esearch.pdf.

Notice of Allowance dated Apr. 25, 2018 in U.S. Appl. No. 15/849,347.

Notice of Allowance dated Sep. 29, 2017 in U.S. Appl. No. 14/808,900.

Office Action dated May 11, 2017 in U.S. Appl. No. 14/808,900.
Office Action dated Nov. 16, 2016 in U.S. Appl. No. 14/808,900.

\* cited by examiner

Document id1

Far
Car

Document id2

Sky
Car

Document id6

Car
Hello

Given:
Secret Key K
Encryption Function F

⇒

Create for each keyword W:

$K_1 \leftarrow F_K(1\|W)$ and
$K_2 \leftarrow F_K(2\|W)$

Encrypted Database (EDB)
Search Index — 90

| Encrypted Keyword Labels | Encrypted Document Index |
|---|---|
| $F_{K_1}(1\|\triangle)$ | $Enc_{K_2}(id1)$ |
| $F_{K_1}(1\|O)$ | $Enc_{K_2}(id2)$ |
| $F_{K_1}(1\|\square)$ | $Enc_{K_2}(id6)$ |
| $F_{K_1}(2\|\triangle)$ | $Enc_{K_2}(id8)$ |
| $F_{K_1}(2\|O)$ | $Enc_{K_2}(id13)$ |
| ⋮ | ⋮ |
| $F_{K_1'}(1\|\triangle)$ | $Enc_{K_2'}(id1)$ |
| $F_{K_1'}(1\|\square)$ | $Enc_{K_2'}(id4)$ |
| ⋮ | ⋮ |

FIG. 10

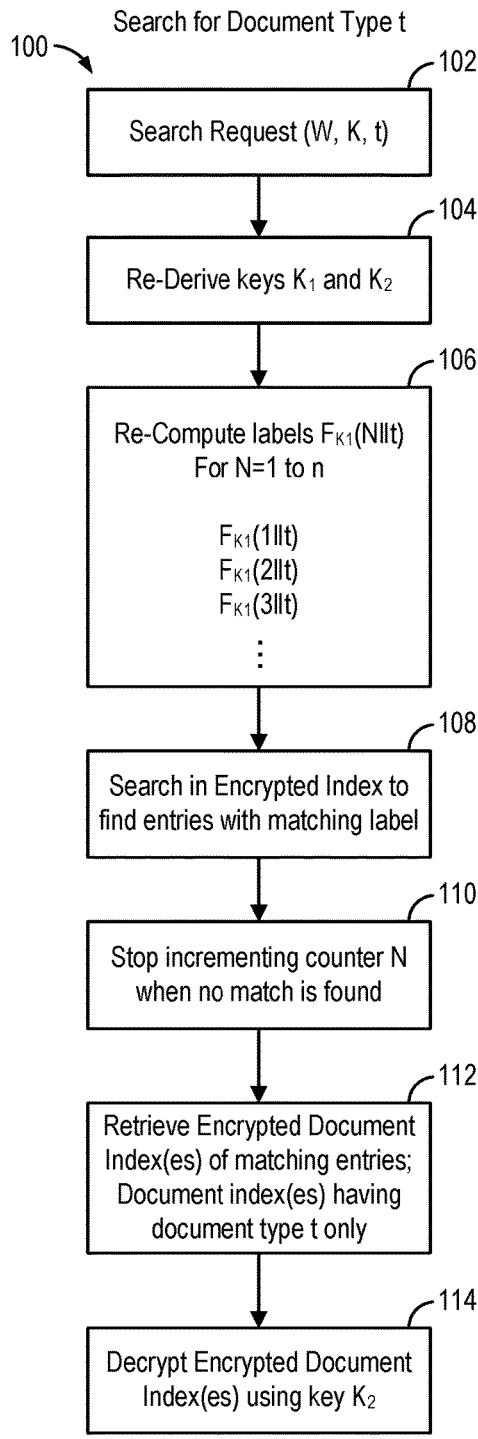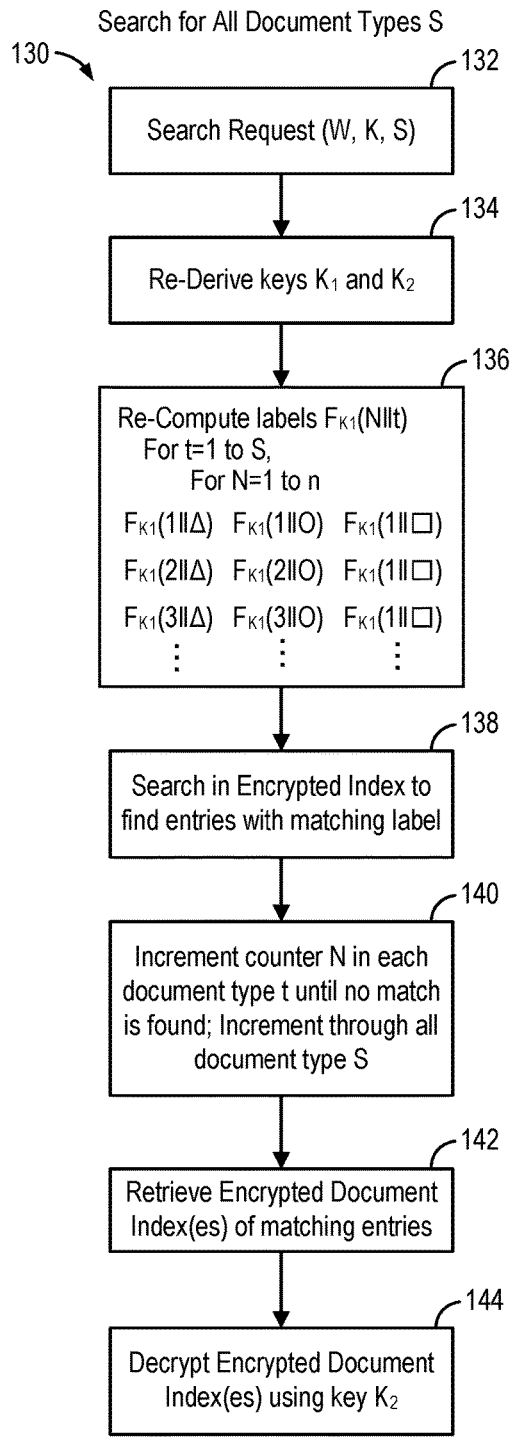
FIG. 11
FIG. 12

Algorithm 1 Setup

1: procedure SETUP(DB)
2:   $K \leftarrow \{0,1\}^\lambda$ and allocate list $L$
3:   for all $w \in W$ do
4:     $K_1 \leftarrow F_K(1\|w), K_2 \leftarrow F_K(2\|w)$
5:     for all $t \in \mathsf{Types}(DB)$ do
6:       $c \leftarrow 0$
7:       for all $id \in DB(w,t)$ do
8:         $\ell \leftarrow F_{K_1}(c{++}\|t); d \leftarrow \mathsf{Enc}_{K_2}(id)$
9:         Add $(\ell, d)$ to the list $L$ (in lex order)
10:  Set $\gamma \leftarrow \mathsf{Create}(L)$

Algorithm 2 Search by Type

1: *Client:*
2:   On input $(K, w, t)$
3:   $K_1 \leftarrow F_K(1\|w); K_2 \leftarrow F_K(2\|w)$
4:   Send $(K_1, K_2, t)$ to the server
5: *Server:*
6: for $c = 0$ until Get returns $\bot$ do
7:   $d \leftarrow \mathsf{Get}(\gamma, F_{K_1}(c\|t)); m \leftarrow \mathsf{Dec}_{K_2}(d)$
8:   Parse and output $id$ in each $m$

Algorithm 3 Search All

*Client:*
  On input $(K, w)$
  $K_1 \leftarrow F_K(1\|w); K_2 \leftarrow F_K(2\|w); S \leftarrow |\mathsf{Types}(DB)|$
  Send $(K_1, K_2, S)$ to the server
*Server:*
for $t = 0$ to $S - 1$ do
  for $c = 0$ until Get returns $\bot$ do
    $d \leftarrow \mathsf{Get}(\gamma, F_{K_1}(c\|t)); m \leftarrow \mathsf{Dec}_{K_2}(d)$
    Parse and output $id$ in each $m$

Fig. 17

SEARCHABLE ENCRYPTION ENABLING ENCRYPTED SEARCH BASED ON DOCUMENT TYPE

CROSS REFERENCE TO OTHER APPLICATIONS

This application is a continuation of U.S. patent application Ser. No. 15/849,347, filed Dec. 20, 2017, which is a continuation of U.S. patent application Ser. No. 14/808,900, filed Jul. 24, 2015, each of which is hereby incorporated by reference herein in its entirety.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue. In particular, cloud-based data storage has also come into widespread use. With more and more user data and files being stored in cloud-based data storage, data security for data and files stored on the cloud-based storage data has become an important issue.

BRIEF DESCRIPTION OF THE DRAWINGS

Various embodiments of the invention are disclosed in the following detailed description and the accompanying drawings.

FIG. 10 illustrates the operation of a searchable encryption method in generating an encrypted search index encoding document types in embodiments of the present invention.

FIG. 11 is a flowchart illustrating a method for executing a search for a document type t using the encrypted search index of FIG. 10 generated by the searchable encryption method in embodiments of the present invention.

FIG. 12 is a flowchart illustrating a method for executing a search for all document types using the encrypted search index of FIG. 10 generated by the searchable encryption method in embodiments of the present invention.

FIG. 16, which includes

FIG. 17 illustrates an example pseudocode which can be used to implement the searchable encryption method encoding document type information in the search index in embodiments of the present invention.

DETAILED DESCRIPTION

Figure 1:
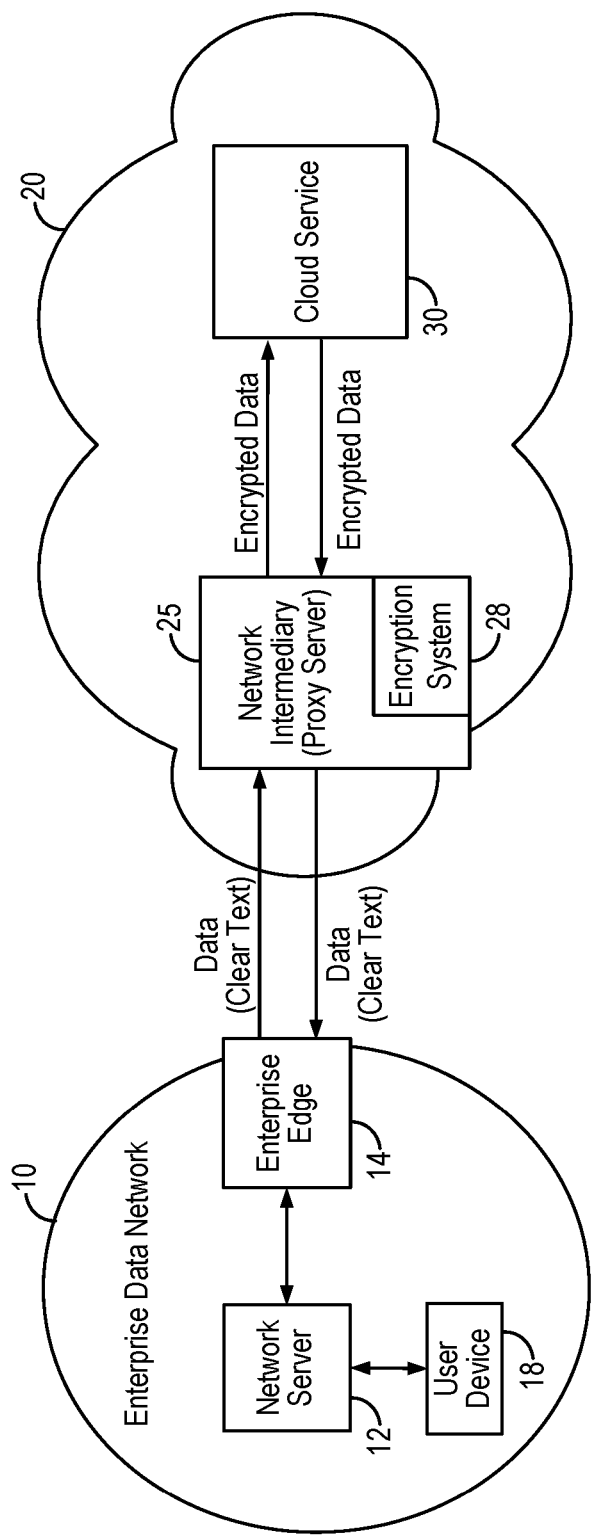
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

According to embodiments of the present invention, a searchable encryption method enables encrypted search of encrypted documents based on document type. In some embodiments, the searchable encryption method is implemented in a network intermediary, such as a proxy server. The network intermediary encrypts documents on behalf of a user or an enterprise destined to be stored on a cloud service provider. The searchable encryption method encodes document type information into the encrypted search index while preserving encryption security. Furthermore, the searchable encryption method enables search of encrypted documents using the same encrypted index, either for a particular document type or for all encrypted documents regardless of the document type. In some embodiments, the searchable encryption method realize document type search in cloud-stored encrypted documents by using the encrypted search index stored on the network intermediary.

In the present description, the term "keyword" refers to any word in a document or a file or a data field and can include one or more characters of the English alphabet (lower case and uppercase letters), numbers 0-9, punctuation symbols, alphabet and symbols of languages other than English, and other ASCII characters. In the present description, the term "wildcard" refers to a character that will match any character or sequence of characters in a search.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage. In some cases, the network intermediary is used to provide additional security function, such as file encryption for uploaded data. For instance, the network intermediary may be used to provide encryption of sensitive data to be stored in a cloud service provider.

FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as a cloud service provider 30, that are deployed on the public data network 20. Network traffic from the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In the present description, the terms "file", "document" and "data" will be used interchangeably to refer to files or documents or data in any format that is being exchanged in the network environment described herein. "Data" as used herein can be structured data (emails, data records with name-value pairs) or unstructured data (word files, spreadsheet files). In the present example, the cloud-based service 30 may be a cloud storage service, such as Box.com or collaboration services, such as Office 365. The cloud-based service 30 may also be a customer relationship management (CRM) service, information technology (IT) service or other types of cloud services. The information being exchanged in the network environment described herein can include data of any format, such as files, documents, emails, or data records of a cloud based service.

More specifically, in the present description, each data object to be encrypted is treated as a "document." A document can be data of any format, including unstructured data such as a file, or structured data such as an email or a data record or a data field in a data record. In some examples, a data field in a data record may contain one or more keywords that can be encrypted and such data field will be treated as a "document" in the present description. In other examples, a data record may contain two or more data fields, of which a portion of the data fields can be encrypted. In that case, each data field that can be encrypted in the data record will be treated as a document. As an example, a data record can be an Event data record or a Contact data record in Salesforce.com.

In some embodiments, the network intermediary 25 performs encryption of data and files before sending the data and files onto the cloud service provider 30. Accordingly, in some embodiments, the network proxy server 25 includes an encryption system 28 which encrypts and decrypts file content based on one or more encryption algorithms. The content can be a file or list of words from the file. The encryption system 28 may utilize keys, algorithms, pseudo random number generators and encoding algorithms suitable for encrypting the files from the user device. In some embodiments, the encryption system 28 may encrypt all or part of the file or data being transmitted to the cloud service provider.

As thus configured, a user in an enterprise data network 10, wishing to use a cloud-based data storage service provider 30 for storing data or files, uses a computing device 18 to access the cloud service provider 30. The user's request is redirected to the network proxy server 25 acting as the network intermediary. The network proxy server 25 may be configured as reverse/forward proxies. Thus, requests and files from the user are intercepted by the network proxy server 25 before reaching the cloud service provider 30. The data or files of the user are sent to the network proxy server 25 in clear text or plaintext. The network proxy server 25 performs, among other things, encryption of the data or files before sending the encrypted files or data onto the cloud service provider for storage. In this manner, data security is ensured as the data and files are stored on the cloud service provider 30 as encrypted data and any one accessing the cloud content on the cloud service provider directly will only see encrypted data. When the file or data is to be retrieved from the cloud service provider 30, the network intermediary 25 retrieves the file or data and also decrypts the file or data. The decrypted file or data is then provided to the user device 18 through the enterprise data network 10. With the use of the network intermediary 25 including the encryption system 28, the enterprise makes use of cloud based services with the security of the cloud data and content being encrypted at rest.

While file-level encryption ensures data security, encryption prevents the cloud stored data from being searched using the cloud service provider's native search routine. For example, cloud-based storage services typically provides search option where the stored files can be searched for keywords using the cloud service's native search routine and this search functionality will not work if the files are encrypted. Searchable encryption algorithms have been described which enables exact match searching in encrypted text. For example, Cash et al. described searchable encryption in the publications entitled "Highly-Scalable Searchable Symmetric Encryption with Support for Boolean Queries" and "Dynamic Searchable Encryption in Very-Large Databases: Data Structures and Implementation," published in CRYPTO 2013 and NDSS 2014, respectively, which publications are incorporated herein by reference in their entireties.

Figure 2:
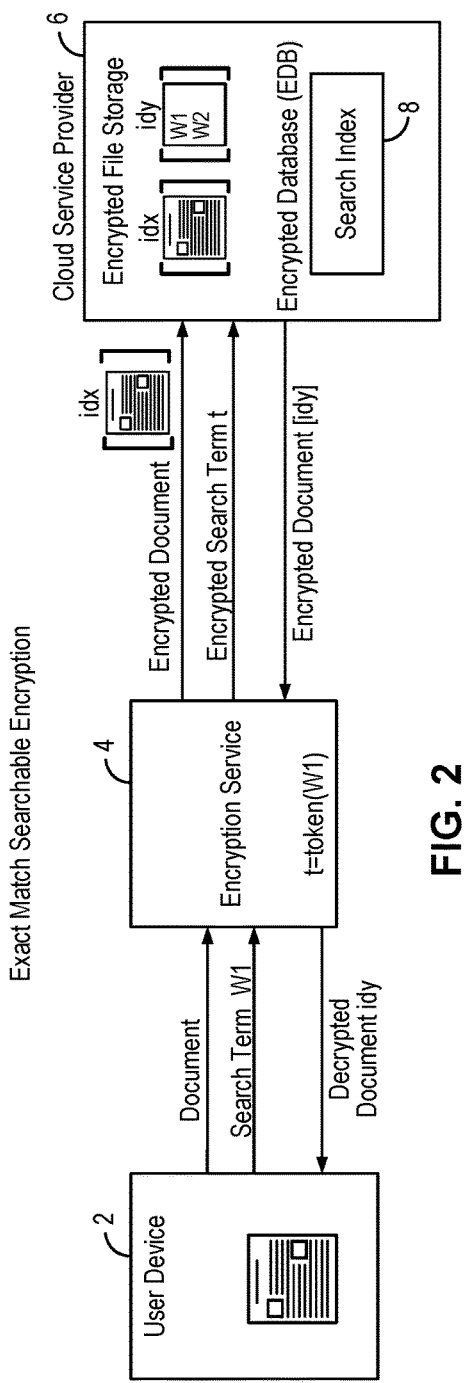
FIG. 2 illustrates the operation of an exact match searchable encryption algorithm in one example.

FIG. 2 illustrates the operation of an exact match searchable encryption algorithm in one example. Referring to FIG. 2, a user device 2 sends a document to be encrypted by an encryption service 4 implementing an exact match searchable encryption algorithm. The encryption service 4 encrypts the document and forwards the encrypted document to a cloud service provider 6 for storage. The encrypted documents stored in the cloud service provider are indexed by a document index (or document ID), such as idx and idy. The document can be encrypted using a bulk encryption algorithm, for example, AES-256. The encryption service 4 further uses the exact match searchable encryption algorithm to encrypt the document to generate an encrypted database (EDB) containing a search index 8 to enable the searching of the encrypted text in the encrypted documents. The search index contains a mapping of encrypted keyword labels to the encrypted document indexes and is also referred to as an encrypted index. To search for a keyword in the encrypted file storage, the user device 2 sends a search term W1 to the encryption service 4. The encryption service 4 encrypts the search term W1 using the exact match searchable encryption algorithm and generates a token t. The encryption service 4 sends the token t to the cloud service provider 6. The cloud service provider 6 can then use its native search routine to search for the token t in the encrypted documents (such as idx and idy). In particular, the cloud service provider 6 searches for the token t in the search index 8. In the event that the token t is found in the search index, the cloud service provider 6 returns the indexed document (e.g. idy) to the encryption service 4 for decryption. The encryption service 4 then decrypts the retrieved encrypted document (e.g. [idy]) provides the decrypted document (e.g. idy) to the user device 2 as the search result.

Figure 3:
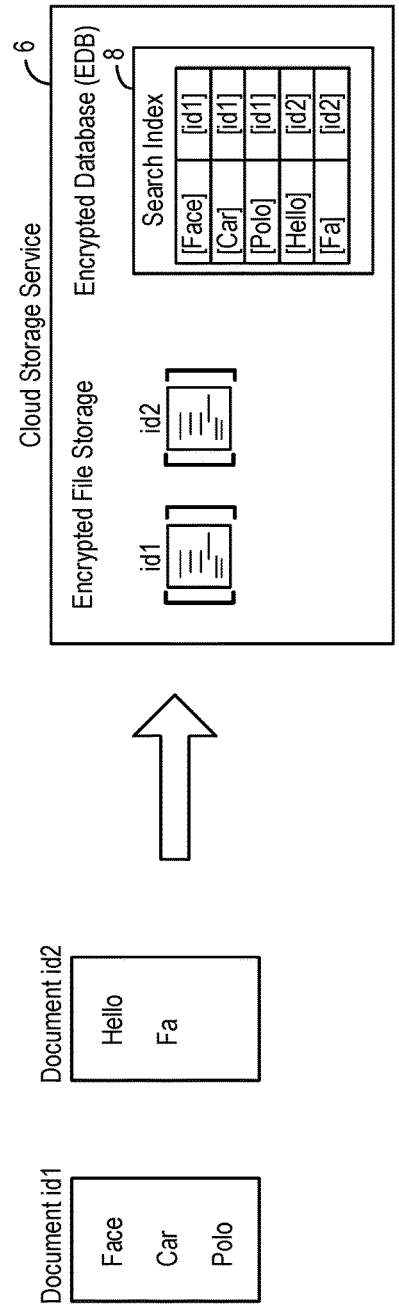
FIG. 3 further illustrates the operation of an exact match searchable encryption algorithm in some examples.

FIG. 3 further illustrates the operation of an exact match searchable encryption algorithm in some examples. In the present example, it is assumed that two documents are being encrypted by the exact match searchable encryption algorithm. The first document (document id1) includes the keywords "Face, Car and Polo" while the second document (document id2) includes the keywords "Hello and Fa". The two documents are encrypted using a bulk encryption algorithm and the encrypted documents [id1] and [id2] are stored in the encrypted file storage of the cloud service provider 6. In the present embodiment, a document or a keyword or a document index that is encrypted is illustrated as being enclosed in a square bracket "[ ]".

The two documents are then encrypted by the exact match searchable encryption algorithm to generate the search index 8 stored in the encrypted database (EDB). The search index 8 which includes a mapping of encrypted keyword labels to encrypted document indexes. For example, the encrypted keyword label "[Face]" is mapped to encrypted document index [id1] in the search index while the encrypted keyword label "[Hello]" is mapped to encrypted document index [id2] in the search index.

To search for a keyword in the encrypted documents, a search term is provided and the encryption service encrypts the search term using the exact match searchable encryption algorithm. The cloud service compares the encrypted search term with the encrypted keyword labels in the search index 8. A match is found only if there is an exact match between the encrypted search term and the encrypted keyword labels in the search index 8. When the exact match is found, the encrypted document index or indexes are returned. In this case, because the encryption for the word "Face" is different from the encryption for the word "Fa", a search request for the search term "Fa" or "Fa*" (where "*" denotes wildcard) will return only document id2 and not document id1 as the encrypted search term for "Fa" will not match exactly the encrypted keyword label for "Face" in the search index 8.

While searchable encryption algorithms have been described, these searchable encryption algorithms only allow for exact match searching. That is, the encrypted text can only be searched for an exact match search term. Wildcard searching, such as prefix or suffix searching, of encrypted text is not possible using the conventional exact match searchable encryption algorithms. Copending and commonly assigned U.S. patent application Ser. No. 14/734, 880 ("the '880 patent application") and copending and commonly assigned U.S. patent application Ser. No. 14/808, 850 ("the '850 patent application"), both entitled "Wildcard Search in Encrypted Text," described a wildcard searchable encryption method to enable wildcard searching of encrypted text in cloud-stored encrypted documents. More specifically, the wildcard searchable encryption method described in the '880 and '850 patent applications performs keyword pre-processing of the document to be encrypted to generate a set of keyword-wildcard combinations in plaintext for some or all of the keywords in the document. The set of keyword-wildcard combinations is appended to the document and encrypted together with the document using an exact match searchable encryption algorithm. As a result of the encryption process, a search index is generated to include the keyword-wildcard combinations. As thus configured, the wildcard searchable encryption method enables wildcard search of the encrypted documents including searches for prefix or suffix of the keywords. The '880 and '850 patent applications are incorporated herein by reference in their entireties.

Figure 4:
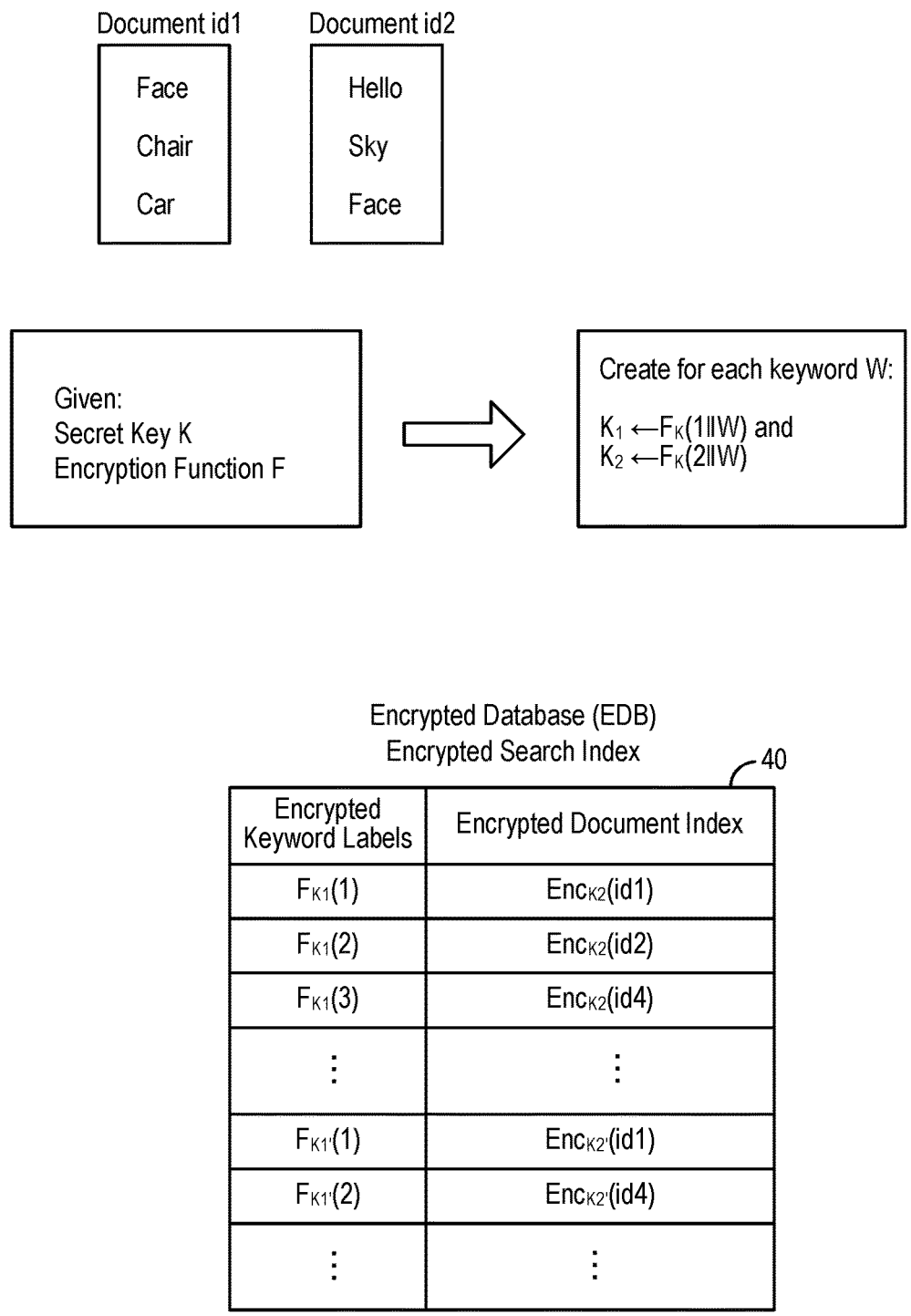
FIG. 4 illustrates the operation of an exact match searchable encryption algorithm in generating an encrypted search index in some examples.

FIG. 4 illustrates the operation of an exact match searchable encryption algorithm in generating an encrypted search index in some examples. Referring to FIG. 4, the present example assumes that two documents id1 and id2, both containing the keyword "Face" among other keywords, are to be encrypted using an exact match searchable encryption algorithm ("the encryption algorithm"), before being stored on a cloud service provider. The exact match searchable encryption algorithm generates a search index 40 as a result of the encryption process. To encrypt the documents on behalf of an enterprise or on behalf of a user of the enterprise, a secret key K belonging to the enterprise and known only to the enterprise is provided. For example, the secret key K can be a random key generated from some space K. Using the secret key K and a variable-input-length pseudorandom function F, the encryption algorithm derives a pair of per-keyword keys. In the present example, the per-keyword keys $K_1$ and $K_2$ are generated for each keyword W. The keys $K_1$ and $K_2$ are used to compute pseudorandom labels and to encrypt the document index or document identifier for use in the search index 40. In the present description, "pseudorandom labels" are sometimes referred to as the "encrypted keyword labels".

More specifically, in some examples, for each keyword W in the documents, the keys $K_1$ and $K_2$ are derived using the secret key K and the pseudorandom function F as follows:

$K_1 \leftarrow F_K(1\|W)$; and $K_2 \leftarrow F_K(2\|W)$, where the symbol "$\|$" denotes the concatenate operation. For example, "$1\|W$" denotes the string of "1" concatenated with W, resulting in a string "1W".

The keys $K_1$ and $K_2$ thus generated contain information relating to the keyword W. In some examples, the key $K_1$ is used to compute the pseudorandom label to use as the encrypted keyword label and the key $K_2$ is used to encrypt the document index.

Because two or more documents may contain the same keyword W, different encrypted keyword labels are computed for each occurrence of the keyword W in different documents so as to avoid leaking information relating to the frequency of the keyword W. As such, for each keyword W, the key $K_1$ and the pseudorandom function F are used to compute a pseudorandom label by applying the pseudorandom function F to a counter value N. The counter value N starts at 1 and increments for each occurrence of the keyword W in a different document. The encryption service maintains a counter table to keep track of the occurrences of each keyword in different documents.

For example, in a first document id1 with the keyword W, a first pseudorandom label is generated as $F_{K1}(1)$ which is computed using the counter value of 1 applied to the pseudorandom function F and using the key $K_1$. Meanwhile, the document index "id1" for the first document is encrypted using the key $K_2$. An entry in the search index 40 is then made by mapping the first pseudorandom label $F_{K1}(1)$ to the encrypted document index $Enc_{K2}(id1)$, as shown in FIG. 4.

As a further example, in a second document id2 with the keyword W, a second pseudorandom label is generated as $F_{K1}(2)$ which is computed using the counter value of 2 applied to the pseudorandom function F and using the key $K_1$. Meanwhile, the document index "id2" for the second document is encrypted using the key $K_2$. An entry in the search index is then made by mapping the second pseudorandom label $F_{K1}(2)$ to the encrypted document index $Enc_{K2}(id2)$, as shown in FIG. 4.

Because the pseudorandom labels $F_{K1}(1)$ and $F_{K1}(2)$ are both generated from the same key $K_1$ which is a function of keyword W, both labels share the same key $K_1$ and so both labels inherently hide the same information relating to keyword W. However, the search index 40 as thus constructed is prevented from frequency analysis attack as the frequency of each keyword is masked by using different pseudorandom labels for each occurrence of the keyword W in a different document.

The search index 40 is thus built by the adding of entries of pseudorandom labels mapping to encrypted document index as each document is being encrypted for the enterprise. For example, when another document id4 contains the keyword W is encrypted, an entry in the search index 40 is made including the pseudorandom label $F_{K1}(3)$ mapping to the encrypted document index $Enc_{K2}(id4)$, as shown in FIG. 4.

For a different keyword Q, a separate set of keys $K_1$ and $K_2$ are derived using the keyword Q, the secret key K and the pseudorandom function F. In the present illustration, to distinguish between the different sets of keys $K_1$ and $K_2$, the keys for the keyword Q will be denoted as $K_{1'}$ and $K_{2'}$. The keys $K_{1'}$ and $K_{2'}$ thus contain information relating to the keyword Q. The encryption algorithm operates in the same manner to compute pseudorandom labels using the key $K_{1'}$ and to encrypt the document index using the key $K_{2'}$. For example, a third pseudorandom label is generated as $F_{K1'}(1)$ which is computed using the counter value of 1 applied to the pseudorandom function F and using the key $K_{1'}$ for keyword Q. An entry in the search index is then made by mapping the third pseudorandom label $F_{K1'}(1)$ to the encrypted document index $Enc_{K2'}(id1)$ encrypted using the key $K_{2'}$, as shown in FIG. 4. Finally, when another occurrence of the keyword Q is found, a fourth pseudorandom label is generated as $F_{K1'}(2)$ which is computed using the counter value of 2 applied to the pseudorandom function F and using the key $K_{1'}$ or keyword Q. An entry in the search index is then made by mapping the fourth pseudorandom label $F_{K1'}(2)$ to the encrypted document index $Enc_{K2'}(id4)$ encrypted using the key $K_{2'}$, as shown in FIG. 4.

As thus configured, the search index 40 can be stored using a generic dictionary data structure. No information is leaked from the search index as both the labels and the document index are encrypted.

Figure 5:
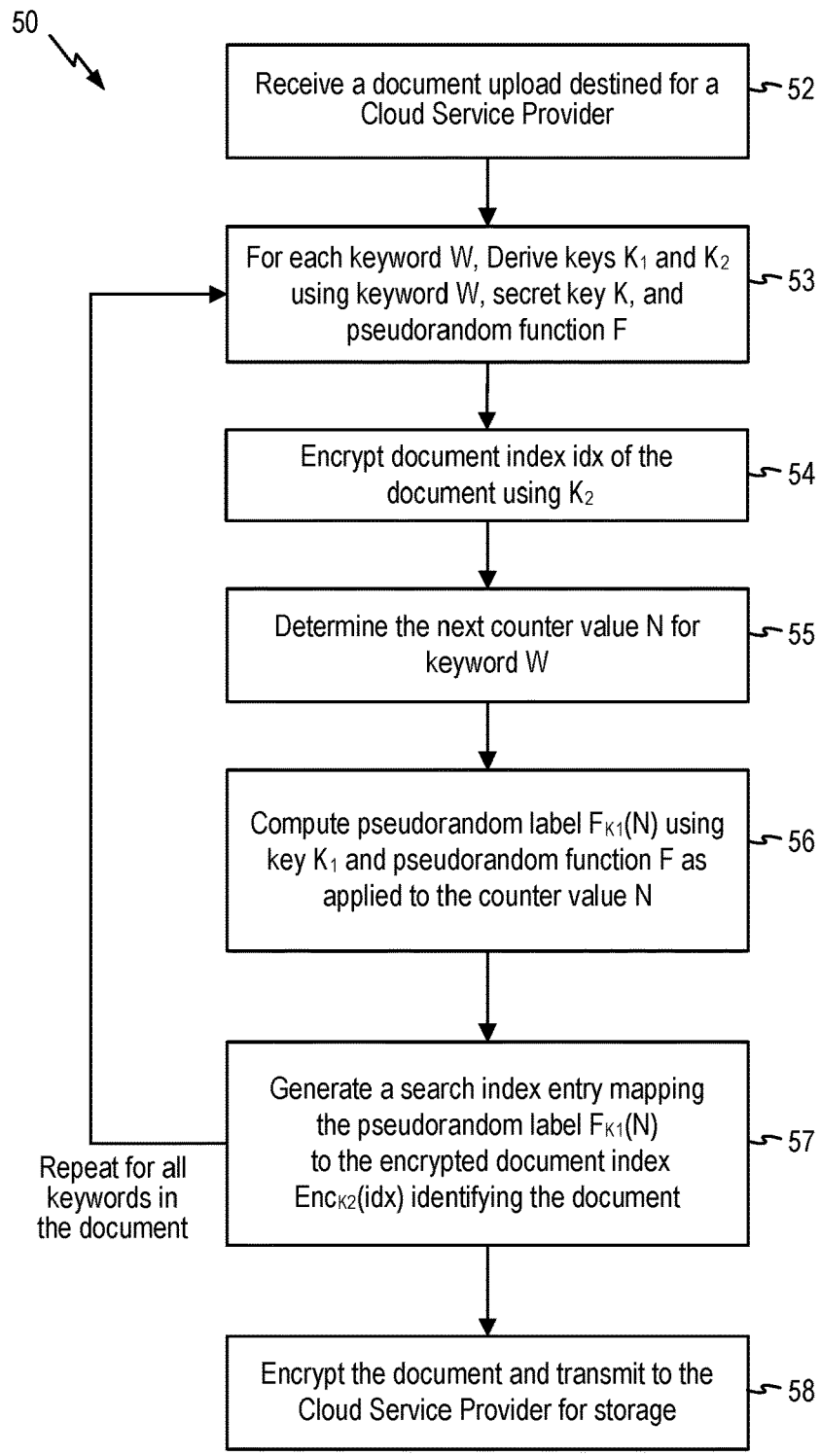
FIG. 5 is a flowchart illustrating an exact match searchable encryption method for encrypting a document in some examples.

FIG. 5 is a flowchart illustrating an exact match searchable encryption method for encrypting a document in some examples. Referring to FIG. 5, an exact match searchable encryption method 50 ("encryption method 50) receives a document upload destined for a cloud service provider (52). The encryption method 50 derives, for each keyword W in the document, keys $K_1$ and $K_2$ using the keyword W, the secret key K associated with the enterprise and known only to the enterprise, and a pseudorandom function F (53). The encryption method 50 encrypts the document index idx of the document using the key $K_2$ (54). The encryption method 50 determines the next counter value N for the keyword W (55). The encryption method 50 then computes a pseudorandom label $F_{K1}(N)$ using the key $K_1$ and the pseudorandom function F as applied to the counter value N (56). The encryption method 50 then generates a search index entry mapping the pseudorandom label $F_{K1}(N)$, also referred to as the encrypted keyword label, to the encrypted document index $Enc_{K2}(idx)$ identifying the document (57). The encryption method 50 repeats steps 53 to 57 for all of the keywords in the document. With the search index thus generated, the encryption method 50 encrypts the document and transmits the encrypted document to the cloud service provider (58). In some embodiments, the method 50 encrypts all or part of the document using an encryption algorithm with the secret key K. In one example, the encryption algorithm is an AES256-GCM authenticated encryption.

Figure 6:
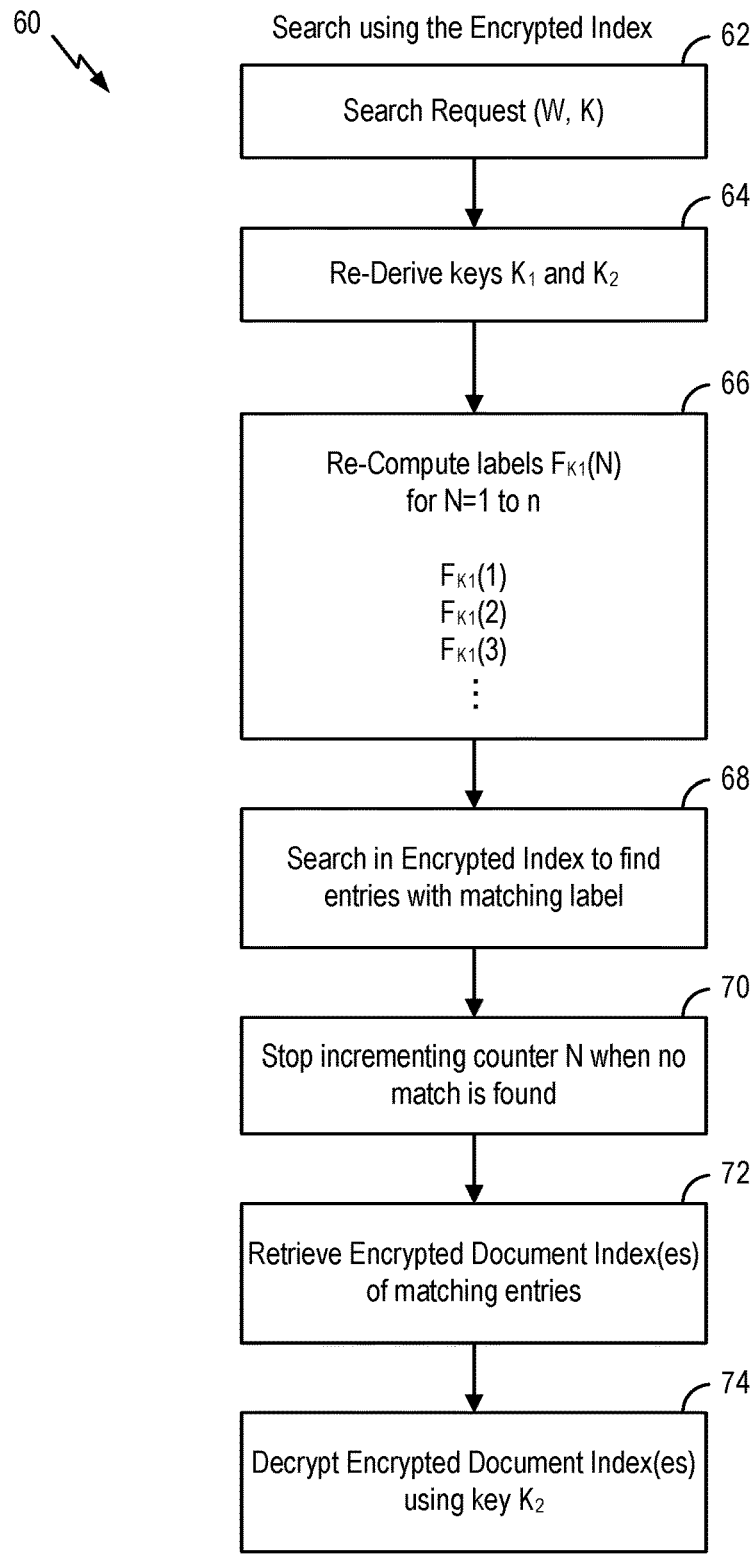
FIG. 6 is a flowchart illustrating a method for executing a search using the encrypted search index of FIG. 4 generated by an exact match searchable encryption algorithm in some examples.

FIG. 6 is a flowchart illustrating a method for executing a search using the encrypted search index of FIG. 4 generated by an exact match searchable encryption algorithm in some examples. Referring to FIG. 6, a method 60 provides the process for executing a search of cloud-stored encrypted documents using the encrypted search index 40 of FIG. 4 generated using the searchable encryption algorithm described in FIG. 5.

To perform a search using the encrypted search index, the method 60 receives a search request with a search term from the user device (62). In particular, the user device executes a search request for documents that are stored on the cloud service provider. The search request contains the search term W and also the secret key K belonging to the enterprise and known only to the enterprise to which the user belongs.

Upon receiving the search request, the method 60 re-derives the keys $K_1$ and $K_2$ using the search term W, the secret key K and the pseudorandom function F (64). Using the key $K_1$, the method 60 re-computes pseudorandom labels $F_{K1}(N)$ associated with the search term W using the pseudorandom function F as applied to a counter value N (66). More specifically, the method 60 re-computes the pseudorandom label $F_{K1}(N)$ in an iterative process starting with the counter value N=1 and incrementing the counter value until no entry is found in the search index. As an example, the method 60 starts with a counter value of N=1 and computes label $F_{K1}(1)$. The counter value N increments and the method 60 computes label $F_{K1}(2)$, $F_{K1}(3)$, and so on in subsequent iterations.

For each pseudorandom label $F_{K1}(N)$ computed, the method 60 searches the encrypted search index for an entry matching the label $F_{K1}(N)$ (68). That is, in this first iteration, the method 60 searches in the search index for the label $F_{K1}(1)$. In the second iteration, the method 60 searches in the search index for the label $F_{K1}(2)$. The method 60 determines whether an entry containing the label $F_{K1}(N)$ is found in the search index. The method 60 keeps incrementing the counter value N until no match is found in the search index (70).

Then, the method 60 retrieves the encrypted document index/indexes of matching entries (72). The method 60 decrypts the encrypted document index/indexes using the key $K_2$ (74). The decrypted document index/indexes can then be used to retrieve the corresponding document(s) from the cloud service provider. The cloud service provider retrieves the encrypted documents and the documents are decrypted and provided to the user device as the search result.

In some cases, the exact match searchable encryption algorithm described in FIGS. 4-6 can be applied to provide wildcard searching by pre-processing the document to include keyword-wildcard combinations, as described in the '880 and '850 patent applications.

Although the exact match searchable encryption algorithm described above can be used to enable search of encrypted documents, the exact match searchable encryption algorithm does not enable searching of encrypted documents based on document type. When a user wishing to search for a keyword but only within a certain document type, searching of the encrypted documents using the aforementioned exact match searchable encryption algorithm may return documents of all document types and the user must perform additional local searching or sorting to obtain the desired search result. Requiring the user to perform additional local searches is not efficient and not desirable.

In the present description, the term "document type" refers to the semantics or logical definition of a document as defined by a computing system, a software program or application, or a user. Accordingly, a document may be given the logical definition as an email, as a file, as a document, as a data record, or as an image with metadata. The logical definition of the document is referred herein as "document type." Thus, as used herein, document types can include, but is not limited to, emails, files, documents, data records, data fields in a data record, and images with metadata.

In embodiments of the present invention, a searchable encryption method enables encrypted search of encrypted documents based on document type by encoding document type information of documents to be encrypted into the encrypted search index such that the document type information is hidden and the search index remains secure. That is, the search index does not reveal information relating to the document type of the encrypted documents. Furthermore, the same encrypted search index can be used to provide search for all document types or search based on specific document type. In this manner, the searchable encryption method of the present invention realizes an efficient searchable encryption algorithm where a single encrypted search index enables searching of encrypted document based on document types or for all document types.

Figure 7:
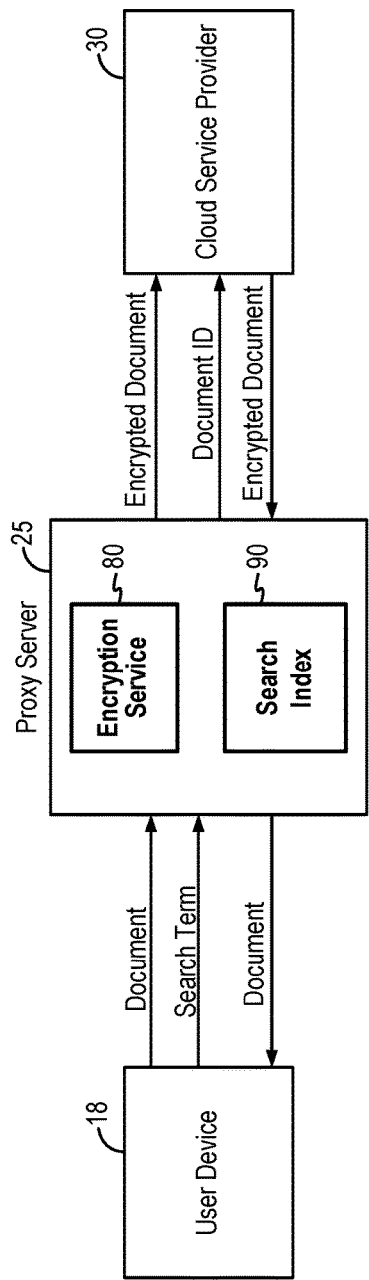
FIG. 7 illustrates the searchable encryption method implemented in a network intermediary in embodiments of the present invention.

FIG. 7 illustrates the searchable encryption method implemented in a network intermediary in embodiments of the present invention. Referring to FIG. 7, in the present embodiment, the searchable encryption method is implemented in a proxy server 25 serving as a network intermediary between a user device 18 and a cloud service provider 30. The user device 18 may be associated with an enterprise data network. Documents or data sent by the user device 18 destined to the cloud service provider 30 are intercepted by the proxy server 25. The proxy server includes an encryption service 80 to encrypt documents on behalf of the user device so that documents are stored on the cloud service provider 30 being encrypted at rest. In accordance with embodiments of the present invention, the encryption service 80 implements the searchable encryption method of the present invention which encodes the document types of the documents to be encrypted. Furthermore, the encryption service 80 is configured to generate an encrypted database (EDB) containing a search index 90 to enable the searching of the encrypted text in the encrypted documents, including searching based on document types.

In embodiments of the present invention, the encryption service 80 is configured to store a search index 90 on the proxy server 25 or with the proxy server 25, separate from the encrypted documents which are being stored on the cloud service provider 30. In conventional searchable encryption algorithms, the search index is typically co-located with the encrypted documents which in the present case are located at the cloud service provider 30. Searching of the encrypted documents therefore takes place on the cloud service provider. However, the searchable encryption method of the present invention stores the encrypted database including the search index 90 on or with the proxy server 25. In this manner, searching of the encrypted text is performed at the proxy server 25 using the search index 90 and the proxy server 25 retrieves the indexed document from the cloud service provider 30. Searching for documents at the cloud service provider is therefore avoided.

In some embodiments, the search index 90 is stored with the proxy server 25. In other embodiments, the search index 90 may be stored on a different physical machine from the proxy server 25 and communicates with the proxy server 25 over a network connection. The exact physical configuration of the proxy server and the search index is not critical to the practice of the present invention. The encryption service 80 and the search index 90 may be implemented on the same server or on different servers. Alternately, the encryption service 80 and the search index 90 may be formed as part of the proxy server 25 or on a separate server in communication with proxy server 25.

Referring to FIG. 7, the user device 18 sends a document to be stored on the cloud service provider 30. The proxy server 25 intercepts the document and passes the document to the encryption service 80 for encryption. The encryption service 80 encrypts the document and generates or updates the search index 90 as a result of encrypting the document. The encrypted document is then sent to the cloud service provider 30 for storage. More specifically, the encryption service 80 encrypts the document using an encryption algorithm, such as a bulk encryption algorithm. In some embodiments, the document is encrypted using a secret key K belonging to and known only by the user or the enterprise to which the user is associated. In one example, the encryption algorithm for encrypting the document is an AES256-GCM authenticated encryption. In some embodiments, the encryption service 80 may encrypt all or part of the document being transmitted to the cloud service provider.

The encryption service 80 further uses an extended exact match searchable encryption algorithm to encrypt the document to generate an encrypted database (EDB) containing a search index 90 to enable the searching of the encrypted text in the encrypted documents. The extended exact match searchable encryption algorithm encodes the document types of the documents to be encrypted into the search index to enable search of the encrypted documents based on document type. The extended exact match searchable encryption algorithm will be described in more details below.

When the user wishes to perform a search of the encrypted documents stored on the cloud service provider 30, the user device 18 transmits a search term which is intercepted by the proxy server 25. The encryption service 80 encrypts the search term using the extended exact match searchable encryption algorithm and searches in the search index 90 for the encrypted search term. When the encrypted search term is matched exactly to an encrypted keyword label in an entry of the search index 90, the encrypted document index associated with the matched encrypted keyword label is retrieved. In practice, the encrypted search term is matched exactly to the encrypted keyword label in each entry of the search index 90 to retrieve all encrypted document indexes matching the encrypted search term. The search index 90 may return one or more encrypted document index/indexes. The encrypted document index or indexes are decrypted and then sent to the cloud service provider 30 to retrieve the encrypted document(s). The encrypted document(s) are returned to the proxy server 25. The encryption service 80 decrypts the document(s) and provides the decrypted document(s) to the user device 18 as the search result.

Figure 8:
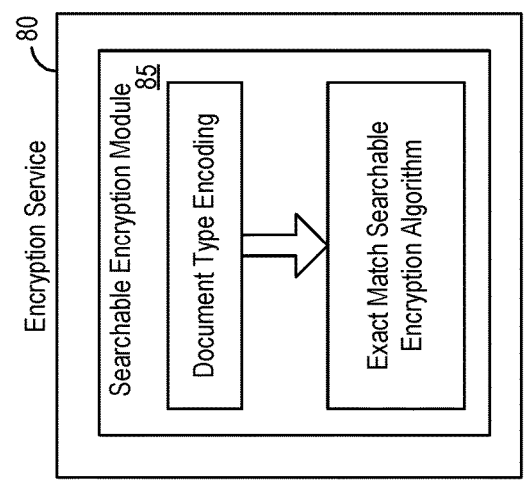
FIG. 8 is a block diagram of the encryption service implementing the searchable encryption method in embodiments of the present invention.

In order to support searching based on document type, the encryption service 80 implements the searchable encryption method of the present invention. FIG. 8 is a block diagram of the encryption service 80 implementing the searchable encryption method in embodiments of the present invention. Referring to FIG. 8, the encryption service 80 includes a searchable encryption module 85 implementing the searchable encryption method. The searchable encryption module 85 is configured to encrypt the document using an extended exact match searchable encryption algorithm. The extended exact match searchable encryption algorithm is based on an exact match searchable encryption algorithm with document type encoding incorporated therein. Exact match searchable encryption algorithms are known and examples of exact match searchable encryption algorithms have been described above with reference to FIGS. 2-6 and also described in the aforementioned papers by Cash et al.

Figure 9:
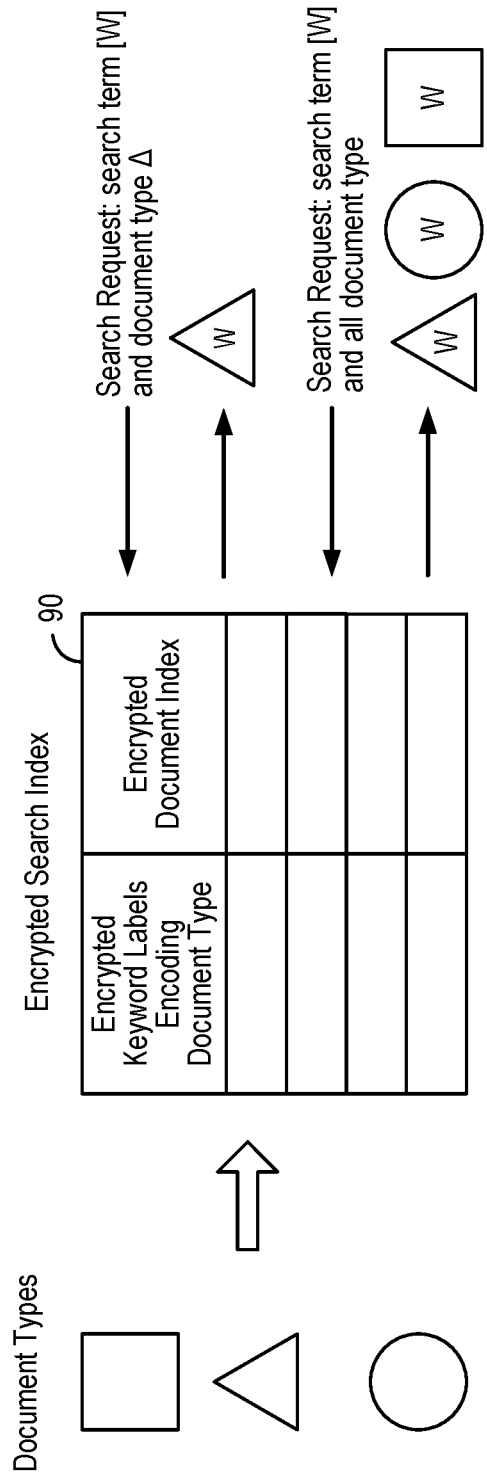
FIG. 9 illustrates a configuration of the encrypted search index generated by the searchable encryption method in embodiments of the present invention.

FIG. 9 illustrates a configuration of the encrypted search index generated by the searchable encryption method in embodiments of the present invention. Referring to FIG. 9, the search index 90 includes a mapping of encrypted keyword labels to encrypted document indexes. The search index 90 is sometimes referred to as an encrypted index or an encrypted search index. In each entry of the search index, an encrypted keyword label is mapped to an encrypted document index identifying the encrypted document containing the respective keyword. In embodiments of the present invention, the document type information for each document is encoded into the encrypted keyword label. In the present illustration, different document types are represented by different object shapes. For example, in FIG. 9, three document types are denoted by a square "☐", a triangle "Δ", and a circle "O". In actual practice, the document type may be identified by a binary number uniquely identifying each document type. For example, a document type identifier "01" may be used to denote text files, a document type identifier "10" may be used to denote data records, and a document type identifier "11" may be used to denote emails. The document type information is encoded in the encrypted keyword labels so that the document type information is hidden but is searchable using the searchable encryption method in accordance with the present invention.

With the document types thus encoded into the encrypted keyword labels, the search index 90 enables searching based on document type. Referring to FIG. 9, when a search request for a search term W and a document type Δ is received by the encryption service, the search index 90 can be searched to return a document index of the requested document type Δ having the keyword W contained therein. The same search index 90 can also be used to enable searching for all document types. In that case, when a search request for a search term W and all document types is received by the encryption service, the search index 90 can be searched to return one or more document indexes of any document type having the keyword W contained therein.

FIG. 10 illustrates the operation of a searchable encryption method in generating an encrypted search index encoding document types in embodiments of the present invention. Referring to FIG. 10, the present example assumes that three documents id1, id2 and id6, all containing the keyword "Car" among other keywords, are to be encrypted using an the searchable encryption method of the present invention, before being stored on a cloud service provider. The searchable encryption method generates a search index 90 as a result of the encryption process. To encrypt the documents on behalf of an enterprise or on behalf of a user of the enterprise, a secret key K belonging to the enterprise and known only to the enterprise is provided. For example, the secret key K can be a random key generated from some space K. Using the secret key K and a variable-input-length pseudorandom function F, the searchable encryption method derives a pair of per-keyword keys $K_1$ and $K_2$ for each keyword W. The keys $K_1$ and $K_2$ are used to compute pseudorandom labels and to encrypt the document index or document identifier for use in the search index 90. In the present description, "pseudorandom labels" are sometimes referred to as the "encrypted keyword labels".

More specifically, in some embodiments, for each keyword W in the documents, the keys $K_1$ and $K_2$ are derived using the secret key K and the pseudorandom function F as follows:

$$K_1 \leftarrow F_K(1\|W); \text{ and}$$

$$K_2 \leftarrow F_K(2\|W),$$

where the symbol "∥" denotes the concatenate operation. For example, "1∥W" denotes the string of "1" concatenated with W, resulting in a string "1W".

The keys $K_1$ and $K_2$ thus generated contain information relating to the keyword W. In some examples, the key $K_1$ is used to compute the pseudorandom label to use as the encrypted keyword label and the key $K_2$ is used to encrypt the document index.

Because two or more documents may contain the same keyword W, different encrypted keyword labels are computed for each occurrence of the keyword W in different documents so as to avoid leaking information relating to the frequency of the keyword W. As such, for each keyword W, the key $K_1$ and the pseudorandom function F are used to compute a pseudorandom label by applying the pseudorandom function F to a counter value N. The counter value N starts at 1 and increments for each occurrence of the keyword W in a different document. The encryption service maintains a counter table to keep track of the occurrences of each keyword in different documents.

Furthermore, the searchable encryption method of the present invention generates the pseudorandom labels using the key $K_1$, the counter value N and also a document type identifier. In this manner, the document type is encoded into the pseudorandom labels of the search index. In some embodiments, the document type identifier is a binary number uniquely identifying each document type. For example, a document type identifier "01" may be used to denote text files, a document type identifier "10" may be used to denote data records, and a document type identifier "11" may be used to denote emails. More specifically, in some embodiments, for each keyword W and a document type t, a pseudorandom label $F_{K1}(N\|t)$ is computed using the key $K_1$, and the pseudorandom function F as applied to the counter value N and the document type t. In particular, the pseudorandom label $F_{K1}(N\|t)$ is computed by concatenating the counter value N and the document type t to form a string "Nt" and the string "Nt" is then applied to the pseudorandom function F using the key $K_1$.

In embodiments of the present invention, the counter value N is incremented for a repeated occurrence of the keyword W in a same document type. Therefore, the pseudorandom label $F_{K1}(N\|t)$ may share the same counter value for different document types.

For example, in a first document id1 of the document type Δ with the keyword W, a first pseudorandom label is generated as $F_{K1}(1\|\Delta)$ which is computed using the counter value of 1 and the document type Δ applied to the pseudorandom function F and using the key $K_1$. Meanwhile, the document index "id1" for the first document is encrypted using the key $K_2$. An entry in the search index 90 is then made by mapping the first pseudorandom label $F_{K1}(1\|\Delta)$ to the encrypted document index $Enc_{K2}(id1)$, as shown in FIG. 10.

As a further example, in a second document id2 of the document type O with the keyword W, a second pseudorandom label is generated as $F_{K1}(1\|O)$ which is computed using the counter value of 1 applied to the pseudorandom function F and using the key $K_1$. Meanwhile, the document index "id2" for the second document is encrypted using the key $K_2$. An entry in the search index is then made by mapping the second pseudorandom label $F_{K1}(1\|O)$ to the encrypted document index $Enc_{K2}(id2)$, as shown in FIG. 10. In this case, the two pseudorandom labels $F_{K1}(1\|\Delta)$ and $F_{K1}(1\|O)$ both share the same counter value of 1 but are associated with different document types. In a third document id6 of the document type □, a third pseudorandom label is generated as $F_{K1}(1\|\square)$, also sharing the same counter value 1.

In another example, in a fourth document id8 of the document type Δ with the keyword W, a fourth pseudorandom label is generated as $F_{K1}(2\|\Delta)$ which is computed using the counter value of 2 and the document type Δ applied to the pseudorandom function F and using the key $K_1$. In this case, the counter value N is incremented to 2 as a document of the same document type having the keyword W is already represented in the search index. Meanwhile, the document index "id8" for the fourth document is encrypted using the key $K_2$. An entry in the search index 90 is then made by mapping the fourth pseudorandom label $F_{K1}(2\|\Delta)$ to the encrypted document index $Enc_{K2}(id8)$, as shown in FIG. 10.

Because the pseudorandom labels $F_{K1}(1\|\Delta)$ and $F_{K1}(1\|O)$ and so on are all generated from the same key $K_1$ which is a function of keyword W, all the pseudorandom labels share the same key $K_1$ and so the labels inherently hide the same information relating to keyword W. However, the search index 90 as thus constructed is prevented from frequency analysis attack as the frequency of each keyword is masked by using different pseudorandom labels for each occurrence of the keyword W for any document type. Furthermore, the pseudorandom labels are encoded with the document type identifier so that the document type information is hidden therein and not subject to frequency analysis attack as the frequency of each document type is masked by using different pseudorandom labels for each occurrence of the keyword W in the same document type.

The search index 90 is thus built by the adding of entries of pseudorandom labels mapping to encrypted document index as each document is being encrypted for the enterprise using the searchable encryption method of the present invention.

For a different keyword Q, a separate set of keys $K_1$ and $K_2$ are derived using the keyword Q, the secret key K and the pseudorandom function F. In the present illustration, to distinguish between the different sets of keys $K_1$ and $K_2$, the keys for the keyword Q will be denoted as $K_{1'}$ and $K_{2'}$. The keys $K_{1'}$ and $K_{2'}$ thus contain information relating to the keyword Q. The searchable encryption method operates in the same manner to compute pseudorandom labels using the key $K_{1'}$ and to encrypt the document index using the key $K_{2'}$. For example, a fifth pseudorandom label is generated as $F_{K1'}(1\|\Delta)$ which is computed using the counter value of 1 and a document type of $\Delta$ applied to the pseudorandom function F and using the key $K_{1'}$ for keyword Q. An entry in the search index is then made by mapping the fifth pseudorandom label $F_{K1'}(1\|\Delta)$ to the encrypted document index $Enc_{K2'}(id1)$ encrypted using the key $K_{2'}$, as shown in FIG. 10. Finally, when another occurrence of the keyword Q is found in another document with a different document type, a sixth pseudorandom label is generated as $F_{K1'}(1\|\square)$ which is computed using the counter value of 1 and the document type $\square$ applied to the pseudorandom function F and using the key $K_{1'}$ or keyword Q. An entry in the search index is then made by mapping the sixth pseudorandom label $F_{K1'}(1\|\square)$ to the encrypted document index $Enc_{K2'}(id4)$ encrypted using the key $K_{2'}$, as shown in FIG. 10.

As thus configured, the search index 90 can be stored using a generic dictionary data structure. No information is leaked from the search index as both the labels and the document index are encrypted. With the search index 90 thus constructed, search based on document type or search for all document type can thus be performed.

FIG. 11 is a flowchart illustrating a method for executing a search for a document type t using the encrypted search index of FIG. 10 generated by the searchable encryption method in embodiments of the present invention. Referring to FIG. 11, a method 100 provides the process for executing a search of cloud-stored encrypted documents using the encrypted search index 90 of FIG. 10 generated using the searchable encryption method of the present invention having the document type encoded therein.

To perform a search using the encrypted search index 90 for a keyword W in a particular document type t, the method 100 receives a search request with a search term W and a document type t from the user device (102). In particular, the user device executes a search request for encrypted documents that are stored on the cloud service provider. The search request contains the search term W, the desired document type t and also the secret key K belonging to the enterprise and known only to the enterprise to which the user belongs.

Upon receiving the search request, the method 100 re-derives the keys $K_1$ and $K_2$ using the search term W, the secret key K and the pseudorandom function F (104). Using the key $K_1$, the method 100 re-computes pseudorandom labels $F_{K1}(N\|t)$ associated with the search term W using the pseudorandom function F as applied to a counter value N and the document type t (106). More specifically, the method 100 re-computes the pseudorandom label $F_{K1}(N\|t)$ in an iterative process starting with the counter value N=1 and incrementing the counter value until no entry is found in the search index. Because the document type t is encoded in the pseudorandom label $F_{K1}(N\|t)$, the pseudorandom label $F_{K1}(N\|t)$ are recomputed only for the one document type t and the search index is searched only for the document type t.

As an example, the method 100 starts with a counter value of N=1 and computes label $F_{K1}(1\|t)$. The counter value N increments and the method 100 computes label $F_{K1}(2\|t)$, $F_{K1}(3\|t)$, and so on in subsequent iterations.

For each pseudorandom label $F_{K1}(N\|t)$ computed, the method 100 searches the encrypted search index 90 for an entry matching the label $F_{K1}(N\|t)$ (108). That is, in this first iteration, the method 100 searches in the search index for the label $F_{K1}(1\|t)$. In the second iteration, the method 100 searches in the search index for the label $F_{K1}(2\|t)$. The method 100 determines whether an entry containing the label $F_{K1}(N\|t)$ is found in the search index. The method 100 keeps incrementing the counter value N until no match is found in the search index (110).

Then, the method 100 retrieves the encrypted document index/indexes of matching entries (112). The document index/indexes retrieved are all of the document type t. The method 100 decrypts the encrypted document index/indexes using the key $K_2$ (114). The decrypted document index/indexes can then be used to retrieve the corresponding document(s) from the cloud service provider. The cloud service provider retrieves the encrypted documents and the documents are decrypted and provided to the user device as the search result. In this manner, the user is provided with a search result of documents of document type t and containing the keyword W.

FIG. 12 is a flowchart illustrating a method for executing a search for all document types using the encrypted search index of FIG. 10 generated by the searchable encryption method in embodiments of the present invention. Referring to FIG. 12, a method 130 provides the process for executing a search of cloud-stored encrypted documents using the encrypted search index 90 of FIG. 10 generated using the searchable encryption method of the present invention having the document type encoded therein.

To perform a search using the encrypted search index 90 for a keyword W for all document types, the method 130 receives a search request with a search term W and a document type S from the user device (132). In embodiments of the present invention, a document type "S" is used to denote all document types in the search method of the present invention. In particular, the user device executes a search request for documents that are stored on the cloud service provider. The search request contains the search term W, the desired document type S, denoting all document types, and also the secret key K belonging to the enterprise and known only to the enterprise to which the user belongs.

Upon receiving the search request, the method 130 re-derives the keys $K_1$ and $K_2$ using the search term W, the secret key K and the pseudorandom function F (134). Using the key $K_1$, the method 130 re-computes pseudorandom labels $F_{K1}(N\|t)$ associated with the search term W using the pseudorandom function F as applied to a counter value N and a document type value t (136). More specifically, the method 100 re-computes the pseudorandom label $F_{K1}(N\|t)$ in an iterative process including two iterative loops which first loops through documents of the same document type and then loops through all document types. That is, the method 130 first increments the counter value N for a document type and then increments the document type t until all document types are processed.

In the present embodiment, the method 130 starts with a first document type, e.g. t=$\Delta$. For the document type t=$\Delta$, the method 130 starts computing pseudorandom labels $F_{K1}(N\|t)$ with the counter value N=1 and incrementing the counter value until no entry is found in the search index. Then, the method 130 increments to the next document type, e.g. t=O.

For the document type t=O, the method 130 starts computing pseudorandom labels $F_{K1}(N\|t)$ with the counter value N=1 and incrementing the counter value until no entry is found in the search index. Then, the method 130 increments to the next document type, e.g. t=□). For the document type t=□, the method 130 starts computing pseudorandom labels $F_{K1}(N\|t)$ with the counter value N=1 and incrementing the counter value until no entry is found in the search index.

In the example shown in FIG. 12, the method 130 starts with computing pseudorandom labels $F_{K1}(N\|t)$ for the first document type Δ and the pseudorandom labels $F_{K1}(1\|\Delta)$, $F_{K1}(2\|\Delta)$, $F_{K1}(3\|\Delta)$, and so on for the same document type are computed. For each pseudorandom label $F_{K1}(N\|\Delta)$ computed, the method 130 searches the encrypted search index 90 for an entry matching the label $F_{K1}(N\|\Delta)$ (138). The method 130 increments through the counter value N for the same document type Δ until no match is found in the search index (140). Then, the method 130 increments to the next document type O. The method 130 starts with computing pseudorandom labels $F_{K1}(N\|t)$ for the second document type O and the pseudorandom labels $F_{K1}(1\|O)$, $F_{K1}(2\|t))$, $F_{K1}(3\|O)$, and so on for the same document type are computed. The method 130 again searches in the search index to find matching labels (138). When no matching label is found, the method 130 increments to the next document type until all document types S have been processed (140).

Then, the method 130 retrieves the encrypted document index/indexes of matching entries (142). The document index/indexes retrieved can be of different document types The method 130 decrypts the encrypted document index/indexes using the key $K_2$ (144). The decrypted document index/indexes can then be used to retrieve the corresponding document(s) from the cloud service provider. The cloud service provider retrieves the encrypted documents and the documents are decrypted and provided to the user device as the search result. In this manner, the user is provided with a search result of documents of any document type and containing the keyword W. Importantly, the same search index 90 is used for searching for all document types or searching for a particular document type.

Figure 13:
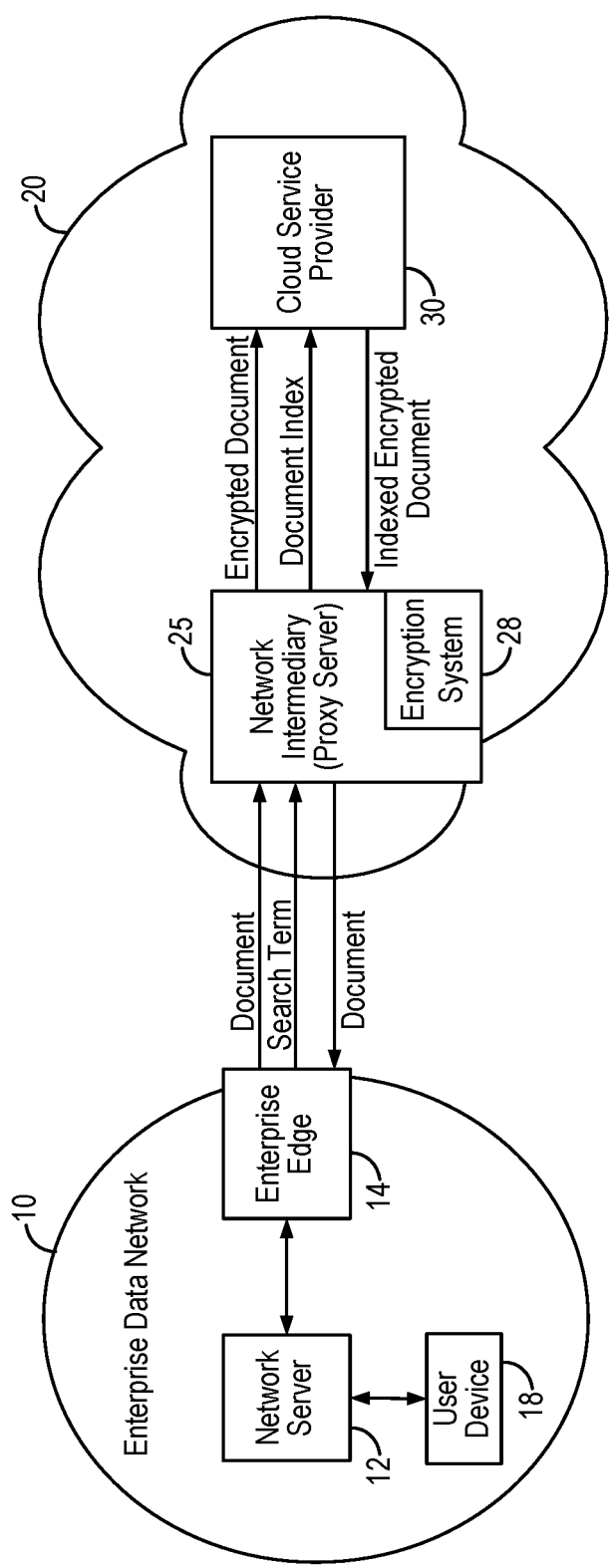
FIG. 13 is a block diagram illustrating a network intermediary implementing the searchable encryption method of cloud data on behalf of an enterprise in some embodiments.

In embodiments of the present invention, the searchable encryption method is employed by an enterprise to perform encryption of the enterprise's cloud stored data so that users of the enterprise can perform search of the cloud stored data based on the document type. FIG. 13 is a block diagram illustrating a network intermediary implementing the searchable encryption method of cloud data on behalf of an enterprise in some embodiments. Referring to FIG. 13, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud service provider 30, that are deployed on the public data network 20. Network traffic form the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

Figure 14:
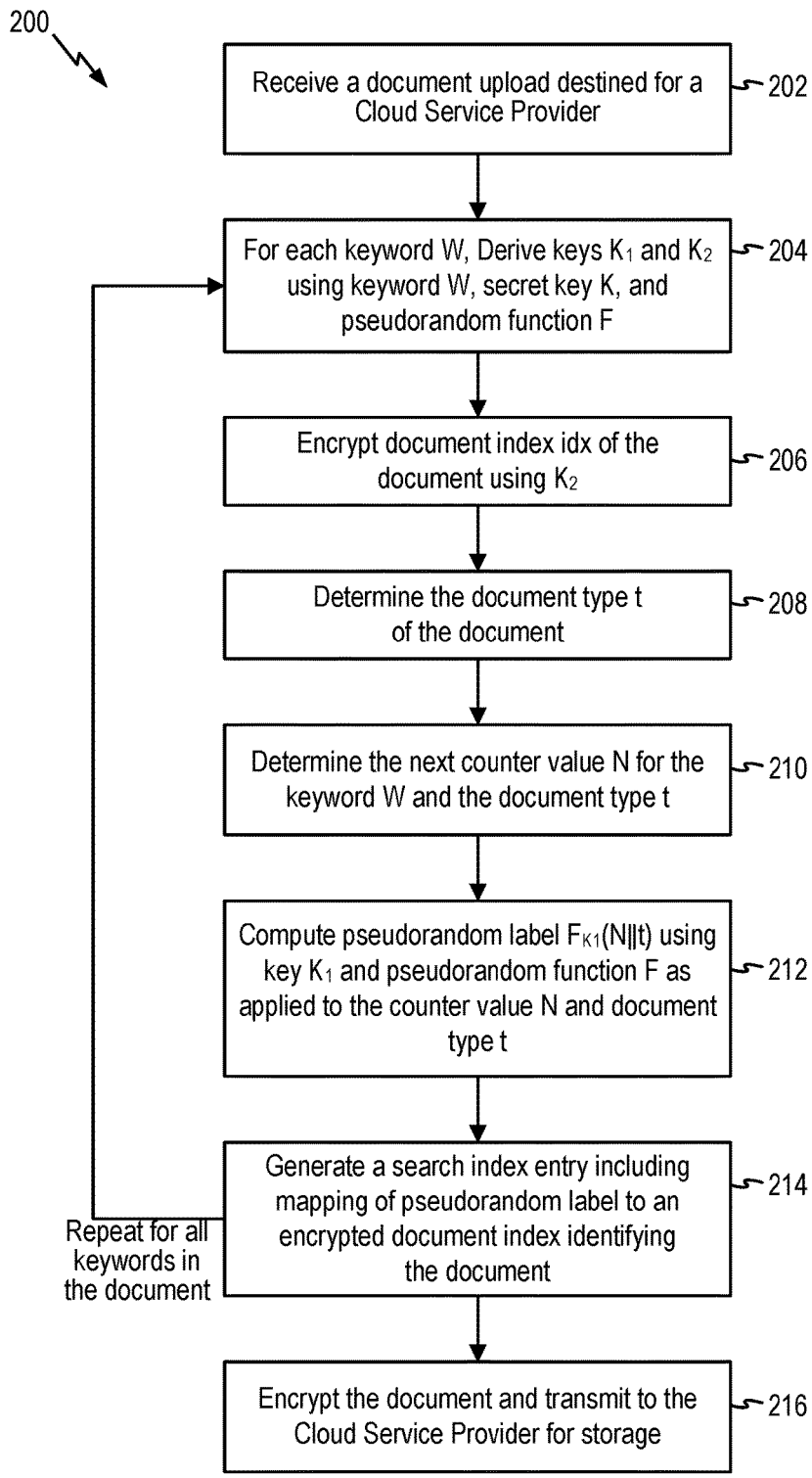
FIG. 14 is a flowchart illustrating a searchable encryption method for encrypting a document in embodiments of the present invention.

To ensure security associated with the use of one or more cloud based services, the enterprise may redirect all network traffic destined for one or more cloud service providers through a network intermediary 25, which can be implemented as a network proxy server. The network intermediary 25 may be configured as reverse/forward proxies. Thus, requests and data from the user device are intercepted by the network intermediary 25 before reaching the cloud service provider 30. In embodiments of the present invention, the network intermediary 25 performs encryption of documents before sending the documents onto the cloud service provider 30. The network proxy server 25 includes an encryption system 28 which encrypts and decrypts document content using the searchable encryption method of the present invention. In some embodiments, the encryption system 28 may encrypt all or part of the document being transmitted to the cloud service provider. In embodiments of the present invention, the network proxy server 25 implements the searchable encryption method 200 described in the flowchart of FIG. 14. FIG. 14 is a flowchart illustrating a searchable encryption method for encrypting a document in embodiments of the present invention.

As described above, the proxy server 25 implementing the searchable encryption method 200 generates a search index that enables encrypted search based on document types. The search index is co-located with the proxy server 25, instead of being located on the cloud service provider 30. In some embodiments, the search index is stored on the proxy server 25. In other embodiments, the search index may be stored on a different physical machine from the proxy server 25 and communicates with the proxy server 25 over a network connection. The exact physical configuration of the proxy server and the search index is not critical to the practice of the present invention. The search index may be formed as part of the proxy server 25 or on a separate server in communication with the proxy server 25.

Referring to FIGS. 13 and 14, a searchable encryption method 200 receives a document upload destined for a cloud service provider (202). The searchable encryption method 200 derives, for each keyword W in the document, keys $K_1$ and $K_2$ using the keyword W, the secret key K associated with the enterprise and known only to the enterprise, and a pseudorandom function F (204). The searchable encryption method 200 encrypts the document index idx of the document using the key $K_2$ (206). The searchable encryption method 200 determines the document type t of the document (208). The searchable encryption method 200 determines the next counter value N for the keyword W and the document type t (210). The searchable encryption method 200 then computes a pseudorandom label $F_{K1}(N\|t)$ using the key $K_1$ and the pseudorandom function F as applied to the counter value N and the document type t (212). The searchable encryption method 200 then generates a search index entry mapping the pseudorandom label $F_{K1}(N\|t)$, also referred to as the encrypted keyword label, to the encrypted document index $Enc_{K2}(idx)$ identifying the document (214). The searchable encryption method 200 repeats steps 204 to 214 for all of the keywords in the document. With the search index thus generated, the searchable encryption method 200 encrypts the document and transmits the encrypted document to the cloud service provider (216). In some embodiments, the searchable encryption method 200 encrypts the document using an encryption algorithm and the secret key K. In one example, the encryption algorithm is an AES256-GCM authenticated encryption. In yet other embodiments, the searchable encryption method 200 may encrypt all or part of the document being transmitted to the cloud service provider.

Figure 15:
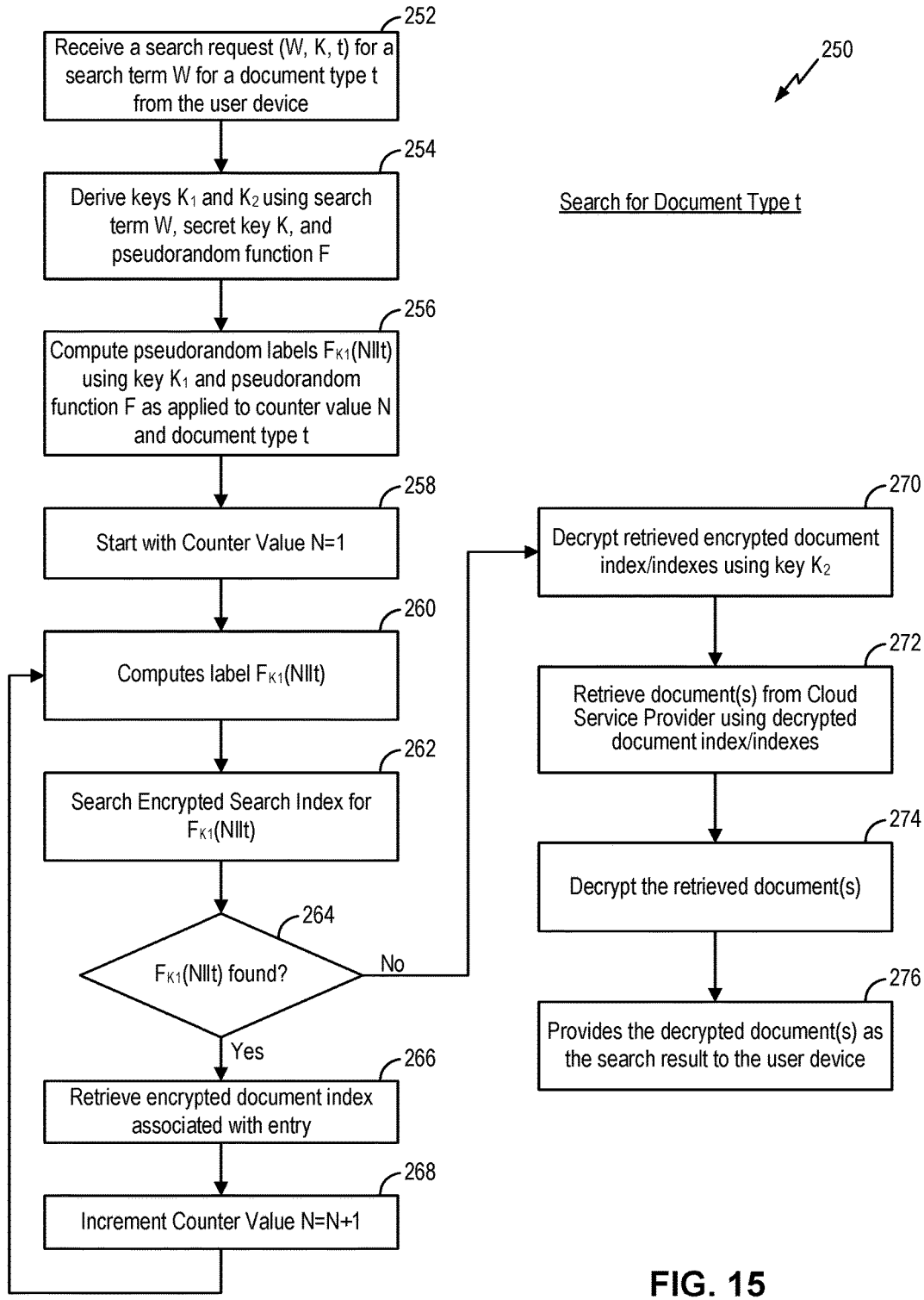
FIG. 15 is a flowchart illustrating a method for executing a search for a given document type using the encrypted search index generated by the searchable encryption method of FIG. 14 in embodiments of the present invention.

FIG. 15 is a flowchart illustrating a method for executing a search for a given document type using the encrypted search index generated by the searchable encryption method of FIG. 14 in embodiments of the present invention. Referring to FIG. 15, a method 250 provides the process for executing a search of cloud-stored encrypted documents using the encrypted search index 90 of FIG. 10 generated using the searchable encryption method which encodes the document type in the search index, as described with reference to FIG. 14. In some embodiment, the method 250 is executed on a proxy server performing encryption of cloud stored documents on behalf of an enterprise, such as proxy server 25 in FIG. 13.

To perform a search using the encrypted search index 90 for a keyword W in a particular document type t, the method 250 receives a search request with a search term W and a document type t from the user device (252). In particular, the user device executes a search request for documents that are stored on the cloud service provider. The search request contains the search term W, the desired document type t and also the secret key K belonging to the enterprise and known only to the enterprise to which the user belongs.

Upon receiving the search request, the method 250 re-derives the keys $K_1$ and $K_2$ using the search term W, the secret key K and the pseudorandom function F (254). Using the key $K_1$, the method 250 re-computes pseudorandom labels $F_{K1}(N\|t)$ associated with the search term W using the pseudorandom function F as applied to a counter value N and the document type t (256). More specifically, the method 250 re-computes the pseudorandom label $F_{K1}(N\|t)$ in an iterative process starting with the counter value N=1 (258). The method 250 computes the pseudorandom label $F_{K1}(N\|t)$ with the current value of N and the given document type t (260).

The method 250 searches the encrypted search index 90 for an entry matching the label $F_{K1}(N\|t)$ (262). That is, in this first iteration, the method 250 searches in the search index for the label $F_{K1}(1\|t)$. In the second iteration, the method 250 searches in the search index for the label $F_{K1}(2\|t)$. The method 250 determines whether an entry containing the label $F_{K1}(N\|t)$ is found in the search index (264). In the event a matching entry is found, the method 250 retrieves the encrypted document index for the matching entry (266). The method 250 then increments the counter value N=N+1 (268) and the method repeats at 260 to compute the pseudorandom label $F_{K1}(N\|t)$ with the current value of N and the document type t.

The method 250 keeps incrementing the counter value N until no match is found in the search index (264). Then, the method 250 decrypts the encrypted document index/indexes that were retrieved using the key $K_2$ (270). The decrypted document index/indexes can then be used to retrieve the corresponding document(s) from the cloud service provider (272). The method 250 may further decrypts the retrieved documents (274) and provided the decrypted documents to the user device as the search result (276). In this manner, the user is provided with a search result of documents of document type t and containing the keyword W.

Figure 16A:
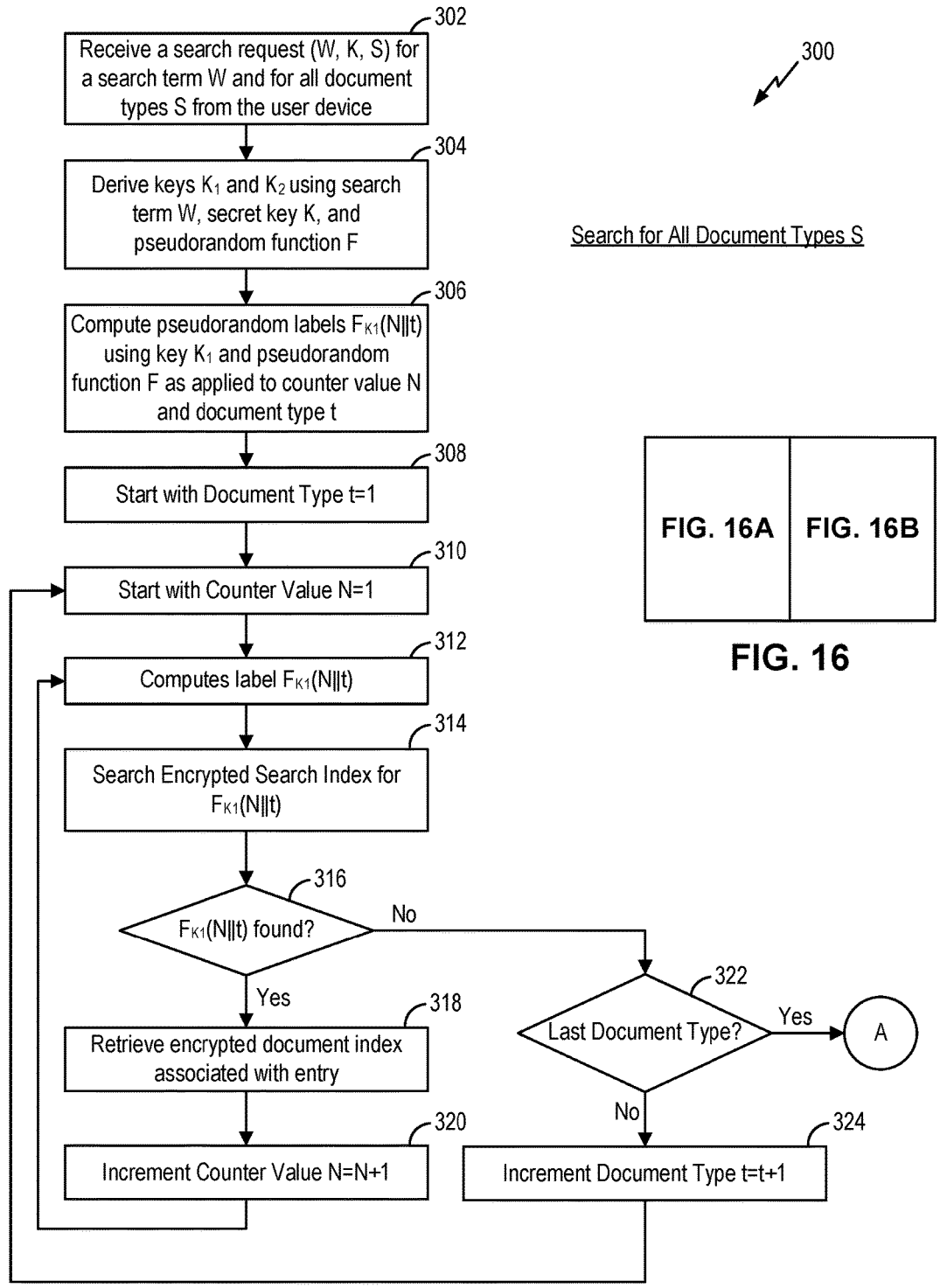
FIGS. 16A and 16B, is a flowchart illustrating a method for executing a search for all document types using the encrypted search index generated by the searchable encryption method of FIG. 14 in embodiments of the present invention.
Figure 16B:
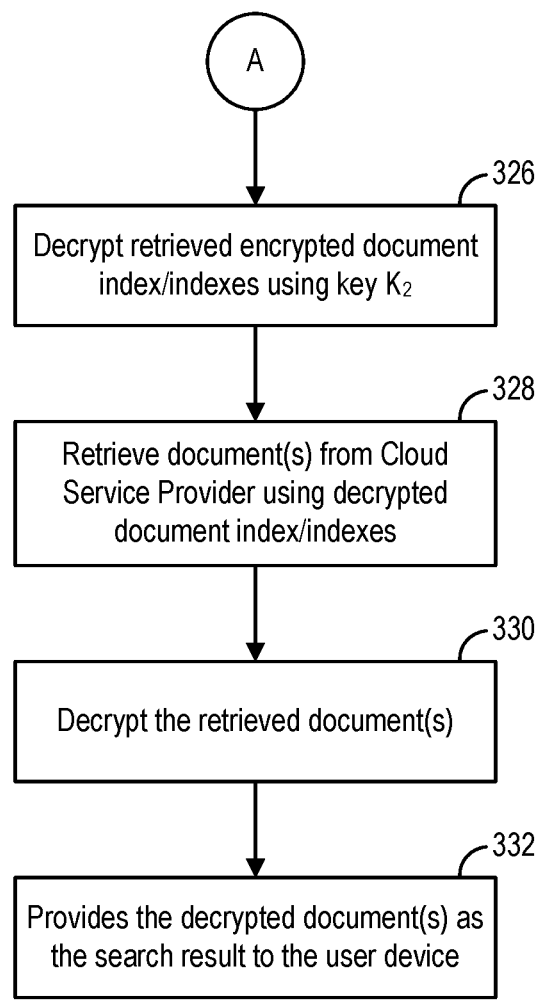

FIG. 16, which includes FIGS. 16A and 16B, is a flow-chart illustrating a method for executing a search for all document types using the encrypted search index generated by the searchable encryption method of FIG. 14 in embodiments of the present invention. Referring to FIG. 16A, a method 300 provides the process for executing a search of cloud-stored encrypted documents using the encrypted search index 90 of FIG. 10 generated using the searchable encryption method which encodes the document type in the search index, as described with reference to FIG. 14. In some embodiment, the method 250 is executed on a proxy server performing encryption of cloud stored documents on behalf of an enterprise, such as proxy server 25 in FIG. 13.

To perform a search using the encrypted search index 90 for a keyword W for all document types, the method 300 receives a search request with a search term W and a document type S from the user device (302). In embodiments of the present invention, a document type "S" is used to denote all document types in the search method of the present invention. In particular, the user device executes a search request for documents that are stored on the cloud service provider. The search request contains the search term W, the desired document type S, denoting all document types, and also the secret key K belonging to the enterprise and known only to the enterprise to which the user belongs.

Upon receiving the search request, the method 300 re-derives the keys $K_1$ and $K_2$ using the search term W, the secret key K and the pseudorandom function F (304). Using the key $K_1$, the method 300 re-computes pseudorandom labels $F_{K1}(N\|t)$ associated with the search term W using the pseudorandom function F as applied to a counter value N and a document type value t (306). More specifically, the method 300 re-computes the pseudorandom label $F_{K1}(N\|t)$ in an iterative process including two iterative loops which first loops through documents of the same document type and then loops through all document types. That is, the method 300 first increments the counter value N for a document type and then increments the document type t until all document types are processed.

In the present embodiment, the method 300 starts with the first document type, i.e., document type t=1 (308). The method 300 then starts with the counter value N=1 (310). The method 300 computes the pseudorandom label $F_{K1}(N\|t)$ using the current value of N and the current value of t (312). The method 300 searches the encrypted search index 90 for an entry matching the label $F_{K1}(N\|t)$ (314). That is, in this first iteration, the method 300 searches in the search index for the label $F_{K1}(1\|1)$. In the second iteration, the method 300 searches in the search index for the label $F_{K1}(2\|1)$. The method 300 determines whether an entry containing the label $F_{K1}(N\|t)$ is found in the search index (316). In the event a matching entry is found, the method 300 retrieves the encrypted document index for the matching entry (318). The method 300 then increments the counter value N=N+1 (320) and the method repeats at 312 to compute the pseudorandom label $F_{K1}(N\|t)$ with the current value of N and the current document type t.

The method 300 keeps incrementing the counter value N until no match is found in the search index (316). Then, the method 300 determines if the current document type t is the last document type being processed (322). When the current document type t is not the last document type, the method 300 increments the document type t=t+1 (324). The method repeats at 310 with setting the counter value N to 1 and then computing the pseudorandom label $F_{K1}(N\|t)$ with the current value of N and the current document type t (312).

Referring to FIG. 16B, when the current document type t is the last document type (322), the method 300 then decrypts the encrypted document index/indexes that were retrieved using the key $K_2$ (326). The decrypted document index/indexes can then be used to retrieve the corresponding document(s) from the cloud service provider (328). The method 300 may further decrypts the retrieved documents (330) and provided the decrypted documents to the user device as the search result (332). In this manner, the user is provided with a search result of documents of all document types and containing the keyword W.

In some embodiments, the searchable encryption method of the present invention can further implements the wildcard searchable encryption method described in the '880 and '850 patent applications to enable wildcard searching of the encrypted documents by pre-processing the document to include keyword-wildcard combinations.

The searchable encryption method of the present invention realizes many advantages. First, the document type information is encoded or encrypted into the encrypted search index so that the document type information is not revealed in plaintext in the search index. Accordingly, the searchable encryption method of the present invention preserves the security properties of the known exact match searchable encryption algorithm with all of the inherent security guarantees while enhancing the search index to encode document type information. The search index remains secure as all information in the search index is encrypted and cannot be discerned without knowing the secret key of the enterprise.

Second, the searchable encryption method of the present invention enables searches based on document type or searches for all document type using the same search index. Multiple search indexes are not needed to maintain information regarding the document types of the encrypted documents.

FIG. 17 illustrates an example pseudocode which can be used to implement the searchable encryption method encoding document type information in the search index in embodiments of the present invention.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
   receiving, at a network intermediary device over a communication network, a received document destined for a cloud service provider, the received document having a received document type;
   determining the received document type of the received document;
   selecting one or more keywords in the received document;
   for each selected one or more keywords in the received document:
      deriving a plurality of keys for the selected keyword;
      encrypting a document index identifying the received document using a first of the plurality of keys using a first encryption algorithm;
      generating an encrypted keyword label based on a second of the plurality of keys, the determined document type, a selected keyword counter value indicative of a count of occurrences of the selected keyword in previously encrypted documents of the received document type, and a pseudorandom function; and
      generating a search index entry mapping the encrypted keyword label to the encrypted document index;
   generating a search index in response to the search index entries generated for the one or more keywords in the received document;
   encrypting the received document using a second encryption algorithm that is different from the first encryption algorithm;
   transmitting the encrypted document to the cloud service provider;
   storing the encrypted document at the cloud service provider;
   receiving, at the network intermediary device, a search request with a search term for all document types;
   generating a search term label based on the pseudorandom function, a key that is a function of the search term, a document type, and a search value;
   searching for the search term label in the search index;
   in response to finding the search term label in the search index:
      retrieving from the search index the encrypted document index corresponding to the search term label;
      changing the search value; and
      after changing the search value, regenerating the search term label based on the pseudorandom function, the key, the document type, and the search value;
   in response to not finding the search term label in the search index:
      changing the document type;
      after changing the document type, regenerating the search term label based on at least the pseudorandom function, the key, and the document type;
   decrypting the retrieved encrypted document index;
   retrieving the encrypted document from the cloud service provider using the decrypted document index;
   decrypting the retrieved document; and
   providing the decrypted document as the search result.

2. The method of claim 1, wherein the document destined for a cloud service provider comprises a plurality of documents and the received document comprises a plurality of received documents, each of the plurality of received documents having a document type that identifies a logical definition of each of the plurality of received documents.

3. The method of claim 1, wherein encrypting the document using the second encryption algorithm comprises:
   encrypting the document using a bulk encryption algorithm.

4. The method of claim 1, wherein receiving, at the network intermediary device over the communication network, the document destined for a cloud service provider further comprises:
   receiving, at a network intermediary device, the document destined for the cloud service provider, the document comprising one of a file, a data record, a data field, a data with structured data format, or a data with unstructured data format, the document having a document type comprising a logical definition of the document.

5. The method of claim 1:
   wherein receiving, at the network intermediary device over the communication network, the document destined for a cloud service provider comprises receiving, at the network intermediary device, a plurality of documents of the same or different document types destined for a cloud service provider, each document type identifying a logical definition of the respective document as defined by a computing system; and
   wherein the search index is stored in the network intermediary device.

6. A system comprising;
   a memory; and
   at least hardware processor collectively configured to:
      receive a received document destined for a cloud service provider, the received document having a received document type;
      determine the received document type of the received document;
      select one or more keywords in the received document;

for each selected one or more keywords in the received document:
  derive a plurality of keys for the selected keyword;
  encrypt a document index identifying the received document using a first of the plurality of keys using a first encryption algorithm;
  generate an encrypted keyword label based on a second of the plurality of keys, the determined document type, a selected keyword counter value indicative of a count of occurrences of the selected keyword in previously encrypted documents of the received document type, and a pseudorandom function; and
  generate a search index entry mapping the encrypted keyword label to the encrypted document index;
generate a search index in response to the search index entries generated for the one or more keywords in the received document;
encrypt the received document using a second encryption algorithm that is different from the first encryption algorithm;
transmit the encrypted document to the cloud service provider;
store the encrypted document at the cloud service provider;
receive a search request with a search term for all document types;
generate a search term label based on the pseudorandom function, a key that is a function of the search term, a document type, and a search value;
search for the search term label in the search index;
in response to finding the search term label in the search index:
  retrieve from the search index the encrypted document index corresponding to the search term label;
  change the search value; and
  after changing the search value, regenerate the search term label based on the pseudorandom function, the key, the document type, and the search value;
in response to not finding the search term label in the search index:
  change the document type;
  after changing the document type, regenerate the search term label based on at least the pseudorandom function, the key, and the document type;
decrypt the retrieved encrypted document index;
retrieve the encrypted document from the cloud service provider using the decrypted document index;
decrypt the retrieved document; and
provide the decrypted document as the search result.

7. The system of claim 6, wherein the document destined for a cloud service provider comprises a plurality of documents and the received document comprises a plurality of received documents, each of the plurality of received documents having a document type that identifies a logical definition of each of the plurality of received documents.

8. The system of claim 6, wherein the at least one hardware processor, in encrypting the document using the second encryption algorithm, encrypts the document using a bulk encryption algorithm.

9. The system of claim 6, wherein the at least one hardware processor, in receiving the document destined for a cloud service provider, receives the document destined for the cloud service provider, the document comprising one of a file, a data record, a data field, a data with structured data format, or a data with unstructured data format, the document having a document type comprising a logical definition of the document.

10. The system of claim 6:
wherein the at least one hardware processor, in receiving the document destined for a cloud service provider, receives a plurality of documents of the same or different document types destined for a cloud service provider, each document type identifying a logical definition of the respective document as defined by a computing system; and
wherein the search index is stored in the network intermediary device.

11. A non-transitory computer-readable medium containing computer-executable instructions that, when executed by a processor, cause the processor to perform a method comprising:
receiving a received document destined for a cloud service provider, the received document having a received document type;
determining the received document type of the received document;
selecting one or more keywords in the received document;
for each selected one or more keywords in the received document:
  deriving a plurality of keys for the selected keyword;
  encrypting a document index identifying the received document using a first of the plurality of keys using a first encryption algorithm;
  generating an encrypted keyword label based on a second of the plurality of keys, the determined document type, a selected keyword counter value indicative of a count of occurrences of the selected keyword in previously encrypted documents of the received document type, and a pseudorandom function; and
  generating a search index entry mapping the encrypted keyword label to the encrypted document index;
generating a search index in response to the search index entries generated for the one or more keywords in the received document;
encrypting the received document using a second encryption algorithm that is different from the first encryption algorithm;
transmitting the encrypted document to the cloud service provider;
storing the encrypted document at the cloud service provider;
receiving a search request with a search term for all document types;
generating a search term label based on the pseudorandom function, a key that is a function of the search term, a document type, and a search value;
searching for the search term label in the search index;
in response to finding the search term label in the search index:
  retrieving from the search index the encrypted document index corresponding to the search term label;
  changing the search value; and
  after changing the search value, regenerating the search term label based on the pseudorandom function, the key, the document type, and the search value;
in response to not finding the search term label in the search index:
  changing the document type;

after changing the document type, regenerating the search term label based on at least the pseudorandom function, the key, and the document type;
decrypting the retrieved encrypted document index;
retrieving the encrypted document from the cloud service provider using the decrypted document index;
decrypting the retrieved document; and
providing the decrypted document as the search result.

12. The non-transitory computer-readable medium of claim 11, wherein the document destined for a cloud service provider comprises a plurality of documents and the received document comprises a plurality of received documents, each of the plurality of received documents having a document type that identifies a logical definition of each of the plurality of received documents.

13. The non-transitory computer-readable medium of claim 11, wherein encrypting the document using the second encryption algorithm comprises:
encrypting the document using a bulk encryption algorithm.

14. The non-transitory computer-readable medium of claim 11, wherein receiving the document destined for a cloud service provider further comprises:
receiving the document destined for the cloud service provider, the document comprising one of a file, a data record, a data field, a data with structured data format, or a data with unstructured data format, the document having a document type comprising a logical definition of the document.

15. The non-transitory computer-readable medium of claim 11:
wherein receiving the document destined for a cloud service provider comprises receiving a plurality of documents of the same or different document types destined for a cloud service provider, each document type identifying a logical definition of the respective document as defined by a computing system; and
wherein the search index is stored in the network intermediary device.

* * * * *